(12) United States Patent
Hunstable

(10) Patent No.: US 11,159,076 B2
(45) Date of Patent: Oct. 26, 2021

(54) CIRCUMFERENTIAL FLUX ELECTRIC MACHINE WITH FIELD WEAKENING MECHANISMS AND METHODS OF USE

(71) Applicant: Linear Labs, LLC, Granbury, TX (US)

(72) Inventor: Fred E. Hunstable, Granbury, TX (US)

(73) Assignee: Linear Labs, Inc., Fort Worth, TX (US)

(*) Notice: Subject to any disclaimer, the term of this patent is extended or adjusted under 35 U.S.C. 154(b) by 555 days.

(21) Appl. No.: 15/977,120

(22) Filed: May 11, 2018

(65) Prior Publication Data

US 2018/0278134 A1 Sep. 27, 2018

Related U.S. Application Data

(63) Continuation of application No. PCT/US2016/057999, filed on Oct. 20, 2016.

(60) Provisional application No. 62/244,155, filed on Oct. 20, 2015.

(51) Int. Cl.
| | |
|---|---|
| *H02K 1/27* | (2006.01) |
| *H02K 16/02* | (2006.01) |
| *H02K 21/02* | (2006.01) |
| *H02K 21/12* | (2006.01) |
| *H02K 21/24* | (2006.01) |

(52) U.S. Cl.
CPC .......... *H02K 16/02* (2013.01); *H02K 21/028* (2013.01); *H02K 21/029* (2013.01); *B60L 2220/50* (2013.01); *H02K 1/2773* (2013.01); *H02K 1/2786* (2013.01); *H02K 1/2793* (2013.01); *H02K 21/12* (2013.01); *H02K 21/24* (2013.01); *H02K 2213/09* (2013.01); *Y02T 10/64* (2013.01); *Y02T 10/72* (2013.01)

(58) Field of Classification Search
CPC .......... H02K 16/02; H02K 1/27; H02K 21/02; H02K 21/24; H02K 21/14; H02K 1/02; H02K 3/28; H02K 1/30; H02K 1/14; H02K 21/12; H02K 3/12; H02K 15/08
See application file for complete search history.

(56) References Cited

U.S. PATENT DOCUMENTS

| | | | |
|---|---|---|---|
| 2,703,370 | A | 3/1955 | Steensen |
| 3,300,663 | A | 1/1967 | Rosaen |
| 3,469,133 | A | 9/1969 | Stcherbatcheff |
| 3,895,245 | A | 7/1975 | Bode |

(Continued)

FOREIGN PATENT DOCUMENTS

| | | |
|---|---|---|
| CN | 2226352 Y | 5/1996 |
| CN | 2452204 Y | 10/2001 |

(Continued)

OTHER PUBLICATIONS

EP Official Action, dated Dec. 10, 2019, by the EPO, re EP Patent App No. 16858253.4.

(Continued)

*Primary Examiner* — Tran N Nguyen
*Assistant Examiner* — Leda T Pham
(74) *Attorney, Agent, or Firm* — Bill R. Naifeh

(57) ABSTRACT

There are presented various embodiments disclosed in this application, including methods and systems of arranging permanent magnets to switch from a first configuration designed for a first torque output to a second configuration designed for a second torque output.

19 Claims, 23 Drawing Sheets

(56) References Cited

U.S. PATENT DOCUMENTS

| | | |
|---|---|---|
| 3,973,137 A | 8/1976 | Drobina |
| 3,979,619 A | 9/1976 | Whiteley |
| 4,237,396 A | 12/1980 | Blenkinsop |
| 4,371,801 A | 2/1983 | Richter |
| 4,388,547 A | 6/1983 | Gruber |
| 4,441,043 A | 4/1984 | DeCesare |
| 4,488,075 A | 12/1984 | DeCesare |
| 4,538,086 A | 8/1985 | Marsh |
| 4,547,713 A | 10/1985 | Langley et al. |
| 4,629,921 A | 12/1986 | Gavaletz |
| 4,739,201 A | 4/1988 | Brigham et al. |
| 4,814,651 A | 3/1989 | Elris |
| 5,004,944 A | 4/1991 | Fisher |
| 5,099,158 A | 3/1992 | Stuart et al. |
| 5,245,238 A | 9/1993 | Lynch et al. |
| 5,455,473 A | 10/1995 | Lipo et al. |
| 5,594,289 A | 1/1997 | Minato |
| 5,691,589 A | 11/1997 | Keim et al. |
| 5,821,710 A | 10/1998 | Masuzawa et al. |
| 5,825,113 A | 10/1998 | Lipo et al. |
| 5,886,450 A | 2/1999 | Kuehnle |
| 5,962,947 A | 10/1999 | Suzuki et al. |
| 5,977,684 A | 11/1999 | Lin |
| 6,054,834 A | 4/2000 | Ha |
| 6,093,986 A | 7/2000 | Windhorn |
| 6,104,108 A | 8/2000 | Hazelton |
| 6,211,597 B1 | 4/2001 | Nakano |
| 6,388,352 B1 | 5/2002 | Huang |
| 6,462,430 B1 | 10/2002 | Joong et al. |
| 6,531,799 B1 | 3/2003 | Miller |
| 6,664,689 B2 | 12/2003 | Rose |
| 6,664,704 B2 | 12/2003 | Calley |
| 6,774,591 B2 | 8/2004 | Arimitsu et al. |
| 6,803,691 B2 | 10/2004 | Rose |
| 6,806,607 B2 | 10/2004 | Lau |
| 6,891,299 B2 | 5/2005 | Coupart |
| 6,924,574 B2 | 8/2005 | Qu et al. |
| 6,924,579 B2 | 8/2005 | Calley |
| 6,930,421 B2 | 8/2005 | Rose |
| 6,930,422 B2 | 8/2005 | Rose |
| 6,967,424 B2 | 11/2005 | Popov |
| 6,975,055 B2 | 12/2005 | Joong et al. |
| 6,979,925 B2 | 12/2005 | Schwamm |
| 6,998,757 B2 | 2/2006 | Seguchi et al. |
| 7,049,722 B2 | 5/2006 | Rose |
| 7,233,088 B2 | 6/2007 | Wise |
| 7,262,536 B2 | 8/2007 | Rahman et al. |
| 7,279,818 B1 | 10/2007 | Wise |
| 7,315,103 B2 | 1/2008 | Qu |
| 7,348,703 B2 | 3/2008 | Bojiuc |
| 7,378,749 B2 | 5/2008 | Moore |
| 7,554,241 B2 | 6/2009 | Rao |
| 7,576,465 B2 | 8/2009 | Bremner |
| 7,732,973 B2 | 6/2010 | Bojiuc |
| 7,755,244 B2 * | 7/2010 | Ley ............................ H02K 3/04 310/216.019 |
| 7,765,905 B2 | 8/2010 | Trumper |
| 7,791,242 B2 | 9/2010 | Bojiuc |
| 7,834,503 B2 | 11/2010 | Bojiue |
| 7,898,134 B1 | 3/2011 | Shaw |
| 8,008,821 B2 | 8/2011 | Calley |
| 8,063,528 B2 | 11/2011 | Toot |
| 8,074,922 B2 | 12/2011 | Bojiuc |
| 8,159,104 B1 | 4/2012 | Bojiuc |
| 8,232,695 B2 | 7/2012 | Bojiuc |
| 8,288,916 B2 | 10/2012 | Quere |
| 8,362,731 B2 | 1/2013 | Smith |
| 8,400,037 B2 | 3/2013 | Wojtowicz |
| 8,415,848 B2 | 4/2013 | Calley |
| 8,598,754 B2 | 12/2013 | Lacour |
| 8,816,554 B2 | 8/2014 | Li et al. |
| 8,912,699 B2 | 12/2014 | Kuntz |
| 9,219,962 B2 | 12/2015 | Hunstable |
| 9,287,745 B2 | 3/2016 | Akatsu et al. |
| 9,419,483 B2 | 8/2016 | Hunstable |
| RE46,449 E | 6/2017 | Bojiuc |
| 9,729,016 B1 | 8/2017 | Hunstable |
| 9,825,496 B2 | 11/2017 | Hunstable |
| 9,876,407 B2 | 1/2018 | Walsh |
| 10,125,814 B2 | 11/2018 | Walsh |
| 10,256,680 B2 | 4/2019 | Hunstable |
| 10,263,480 B2 | 4/2019 | Hunstable |
| 10,284,029 B2 | 5/2019 | Hunstable |
| 10,326,343 B2 | 6/2019 | Walsh |
| 10,340,768 B2 | 7/2019 | Walsh |
| 2003/0025417 A1 | 2/2003 | Rose |
| 2004/0027022 A1 | 2/2004 | Weir |
| 2004/0061397 A1 | 4/2004 | Rose |
| 2004/0194286 A1 | 10/2004 | Rose |
| 2004/0195932 A1 | 10/2004 | Rose |
| 2004/0195933 A1 | 10/2004 | Rose |
| 2004/0232800 A1 | 11/2004 | Seguchi et al. |
| 2005/0194855 A1 | 9/2005 | Hasebe |
| 2006/0038454 A1 | 2/2006 | Bojiuc |
| 2006/0273686 A1 | 12/2006 | Edelson et al. |
| 2007/0228860 A1 * | 10/2007 | Rao ............................ H02K 1/12 310/156.37 |
| 2008/0278019 A1 | 11/2008 | Lu et al. |
| 2009/0102305 A1 | 4/2009 | Lu |
| 2009/0224627 A1 | 9/2009 | Hino et al. |
| 2009/0224628 A1 | 9/2009 | Hiwaki et al. |
| 2009/0261675 A1 | 10/2009 | Hsiao et al. |
| 2010/0164422 A1 | 7/2010 | Shu et al. |
| 2010/0289365 A1 | 11/2010 | Bando et al. |
| 2011/0187222 A1 | 8/2011 | Li et al. |
| 2012/0153763 A1 | 6/2012 | Kenji |
| 2012/0286616 A1 | 11/2012 | Li |
| 2013/0249343 A1 | 9/2013 | Hunstable |
| 2014/0070651 A1 | 3/2014 | Gerfast |
| 2014/0191612 A1 | 7/2014 | Mariotto |
| 2015/0001976 A1 | 1/2015 | Hunstable |
| 2015/0137647 A1 | 5/2015 | Hunstable |
| 2015/0171694 A1 | 6/2015 | Walsh |
| 2016/0020652 A1 | 1/2016 | Hunstable |
| 2016/0094096 A1 | 3/2016 | Hunstable |
| 2016/0380496 A1 | 12/2016 | Hunstable |
| 2017/0237325 A1 | 8/2017 | Hunstable |
| 2018/0131244 A1 | 5/2018 | Hunstable |
| 2018/0212486 A1 | 7/2018 | Hunstable |
| 2018/0331593 A1 | 11/2018 | Hunstable |
| 2019/0103793 A1 | 4/2019 | Walsh |
| 2019/0199185 A1 | 6/2019 | Hunstable |
| 2019/0312497 A1 | 10/2019 | Walsh |

FOREIGN PATENT DOCUMENTS

| | | |
|---|---|---|
| CN | 101005229 A | 7/2007 |
| CN | 101212150 B | 5/2011 |
| CN | 102687378 A | 9/2012 |
| CN | 102761179 A | 10/2012 |
| CN | 102792569 A | 11/2012 |
| CN | 103683768 A | 3/2014 |
| CN | 104272559 A | 1/2015 |
| CN | 104285366 A | 1/2015 |
| CN | 109891726 A | 6/2019 |
| DE | 102010024344 A1 | 12/2011 |
| EP | 0729663 B1 | 5/2001 |
| EP | 1191673 A2 | 3/2002 |
| EP | 1990894 A2 | 11/2008 |
| JP | S51133709 | 11/1976 |
| JP | S5492305 | 12/1977 |
| JP | S58116050 A | 7/1983 |
| JP | S61173658 A | 8/1986 |
| JP | S61144782 | 9/1986 |
| JP | 2002-254268 A | 9/2002 |
| JP | 2002369473 A | 12/2002 |
| JP | 2006217771 A | 8/2006 |
| JP | 2008-043127 A | 2/2008 |
| JP | 2008141853 A | 6/2008 |
| JP | 2010166741 A | 7/2010 |
| JP | 2015-177646 A | 10/2015 |
| KR | 101276633 B1 | 6/2013 |
| WO | 2003077403 A1 | 9/2003 |
| WO | 2008/006906 A1 | 1/2008 |

(56) References Cited

FOREIGN PATENT DOCUMENTS

| WO | 2008006906 A1 | 1/2008 |
|---|---|---|
| WO | 2008096913 A1 | 8/2008 |
| WO | 2011032675 A2 | 3/2011 |
| WO | 2016164818 A1 | 10/2016 |
| WO | 2017003955 A1 | 1/2017 |
| WO | 2017070403 A1 | 4/2017 |
| WO | 2018045360 A1 | 3/2018 |

OTHER PUBLICATIONS

CN Office Action, dated Jul. 9, 2019, by the CIPO, re Patent App No. 201680061215.1.
Wang et al.; Field-Weakening Performance Improvement of the Yokeless and Segmented Armature Axial Flux Motor for Electric Vehicles; Energies 2017, 10, 1492; Sep. 26, 2017.
Ohalmers; Field weakening in brushless p-m motors; Mavilor Motors, S. A.; Infranor Group Company; Mar. 2004.
Soong, et al.; Field-Weakening Performance of Interior Permanent-Magnet Motors; IEEE Transactions on Industry Application, vol. 38, No. 5; Sep./Oct. 2002; 1251-1258.
Aydin et al.; Design Considerations and Experimental Results of an Axial Flux PM Motor with Field Control; Research Reoprt 2004-23; Wisconsin Electric Machines & Power Electronics Consortium; University of Wisconsin-Madison; 2004.
Lipo et al.; Field Weakening of Permanent Magnet Machines-Design Approaches; Research Report 2004-13; Wisconsin Electric Machines & Power Electronics Consortium; University of Wisconsin-Madison; 2004.
Hsu, A Machine Approach for Field Weakening of Permanent-Magnet Motors; Society of Automotive Engineers, Inc.; 1998.
Aydin, Metin, et al., "Design and 3D Electromagnetic Field Anaylsis of Non-slotted and Slotted TORUS Type Axial Flux Surface Mounted Permanent Magnet Disc Machines," IEEE International Electric Machines and Drives Conference, Jun. 17-20, 2001, pp. 645-651.
Aydin, Metin, et al., "Performance Evaluation of an Axial Flux Consequent Pole PM Motor using Finite Element Analysis," IEEE International Electric Machines and Drives Conference, vol. 3, Jun. 1-4, 2003, pp. 1682-1687.
Huang, Surong, et al., "TORUS Concept Machines: Pre-Prototyping Design Assessment for Two Major Topologies," IEEE Industry Applications Conference, vol. 3, Sep. 30-Oct. 4, 2001, pp. 1619-1625.
Australian Exam Report, dated May 10, 2016, re Patent App No. 2013235132; 3 pages.
Chinese Office Action, dated Jul. 20, 2016, re Patent App No. 201380022180.7; 9 pages.
Japanese Office Action, dated Jan. 25, 2017, re JP Patent App No. 2015-501894.
International Search Report and Written Opinion of the ISA, dated Aug. 8, 2014, re PCT/US2013/033198.
International Search Report and Written Opinion of the ISA, dated Aug. 18, 2016, re PCT/US2016/026776.
International Search Report and Written Opinion, dated Nov. 3, 2016, by the ISA/RU, re PCT/US2016/039673.
International Search Report and Written Opinion, dated Jan. 9, 2017, by the ISA/US, re PCT/US2016/057999.
Chinese Office Action, dated Apr. 19, 2017, re CN App No. 201380022180.7.
Office Action, dated Jul. 21, 2017, by the USPTO, re U.S. Appl. No. 15/413,228.
Final Office Action, dated Mar. 9, 2018, by the USPTO, re U.S. Appl. No. 15/413,228.
International Search Report and Written Opinion, dated Mar. 15, 2018, by the ISA/RU, re PCT/US2017/049981.
Office Action, dated Jun. 27, 2018, by the USPTO, re U.S. Appl. No. 15/008,431.
Office Action, dated Sep. 19, 2018, by the USPTO, re Patent App No. 15/413,228.
EP Exam Report, dated Apr. 18, 2018, by the EPO, re EP App No. 13714168.5.
EP Search Report, dated Oct. 26, 2018, re EP Patent App No. 16777421.5.
EP Official Action, dated Nov. 13, 2018, by the EPO, re EP App No. 16777421.5.
EP Exam Report, dated Oct. 10, 2018, by the EPO, re EP App No. 13714168.5.
Indian Exam Report, dated Nov. 19, 2018, by IP India, re IN App No. 8335/DELNP/2014.
CA Office Action, dated Jan. 24, 2019, by the CIPO, re CA App No. 2,881,979.
Office Action, dated Feb. 25, 2019, by the USPTO, re U.S. Appl. No. 15/848,540.
EP Extended Search Report, dated Feb. 22, 2019, by the EPO, re EP App No. 16818559.3.
Notice of Allowance, dated Mar. 6, 2019, by the USPTO, re U.S. Appl. No. 15/008,431.
EP Office Action, dated Mar. 12, 2019, by the EPO, re EP App No. 16818559.3.
Notice of Allowance, dated Apr. 10, 2019, by the USPTO, re U.S. Appl. No. 15/413,228.
Extended EP Search Report, dated Apr. 18, 2019, by the EPO, re EP App No. 16858253.4.
Chinese Office Action, dated Apr. 10, 2019, by the CIPO, re CN App No. 201680033171.1.
EP Official Action, dated May 8, 2019, by the Epo, re EP Patent App No. 16858253.4.
Notice of Allowance, dated Jun. 12, 2019, by the USPTO, re U.S. Appl. No. 15/848,540.
Notice of Allowance, dated May 31, 2019, by the Uspto, re U.S. Appl. No. 16/374,132.
Office Action, dated Jun. 27, 2019, by the USPTO, re U.S. Appl. No. 15/813,360.
CN Office Action, dated Jun. 5, 2019, by the CIPO, re CN Patent App No. 201680050018.X.
Notice of Allowance, dated Jun. 24, 2019, by the USPTO, re U.S. Appl. No. 15/008,431.
CN Second Office Action, dated May 29, 2020, re CN App No. 201680061215.1.
IN Exam Report, dated Jul. 6, 2020, by the India Patent Office, re IN App No. 201817013288.
BR Exam Report, dated Aug. 25, 2020, by the BPO, re BR App No. BR112018007810-7.
EP Communication pursuant to Article 94(3) EPC, dated Oct. 14, 2020, re EP App No. 16858253.4.
JP Office Action, dated Oct. 15, 2020, by JPO, re JP App No. 2018-540691.

* cited by examiner

CIRCUMFERENTIAL FLUX ELECTRIC MACHINE WITH FIELD WEAKENING MECHANISMS AND METHODS OF USE

RELATED APPLICATIONS

This application is a continuation of International Application No. PCT/US2016/057999, entitled "A Circumferential Flux Electric Machine with Field Weakening Mechanisms and Methods of Use," filed Oct. 20, 2016, which claims the benefit of U.S. Provisional Application, Ser. No. 62/244,155 entitled "A Switchable Toroidal Electric Motor/Generator", filed on Oct. 20, 2015. The disclosures of which are incorporated by reference for all purposes.

This application is also commonly owned with the following U.S. patent applications: U.S. provisional patent application Ser. No. 62/185,637 entitled "A Improved Multi-Tunnel Electric Motor/Generator," filed on Jun. 28, 2015; U.S. provisional patent application Ser. No. 62/144,654 entitled "A Multi-Tunnel Electric Motor/Generator," filed on Apr. 4, 2015; U.S. provisional patent application No. "62/055,615, entitled "An Improved DC Electric Motor/Generator with Enhanced Permanent Magnetic Flux Densities," filed on Sep. 25, 2014; U.S. provisional patent application Ser. No. 62/056,389, entitled "An Improved DC Electric Motor/Generator with Enhanced Permanent Magnetic Flux Densities," filed on Sep. 26, 2014; U.S. application Ser. No. 13/848,048, entitled "An Improved DC Electric Motor/Generator with Enhanced Permanent Magnetic Flux Densities" filed on Mar. 20, 2013; which claims the benefit of U.S. Provisional Application Ser. No. 61/613,022, filed on Mar. 20, 2012, of which all of the disclosures are hereby incorporated by reference for all purposes.

TECHNICAL FIELD

The invention relates in general to a new and improved electric motor/generator, and in particular to an improved system and method for producing rotary motion from a electromagnetic motor or generating electrical power from a rotary motion input.

BACKGROUND INFORMATION

In many engines there is a need for a high torque output at relatively low speeds or wattages, then as speeds increase, the torque can be decreased. In electric vehicle applications, low speed operation often requires constant torque operation at less than the base speed for moving heavy loads, or traversing rough terrain or inclines such as hills. For instance, high torque may be required for local trash pickup when the trucks are moving slowly from house to house, but there is less need for high torque when the truck is in on the highway at higher speeds. Similarly, construction and tractors may have a need for high torque during earth moving and plowing, but low torque when the machines are in transport mode or moving along a street. Conveyor motors may need a high torque when they first start and lower torque after they have reached their operational speed.

In many cases, high speed operation requires double or triple the base speed for cruising on level roads or developed industrial sites. In this high speed mode, torque requirements are low and constant power operation is desired. In constant power operation the available torque is inversely proportional to the speed. Constant power mode in a motor equipped with a mechanism that controls back emf provides an operation that is similar to shifting gear ratios in a transmission, i.e., higher speeds are traded for lower available torque.

Thus, there is also a need for motors to generate high torque in one mode, and relatively lower torque in another mode once higher speeds have been reached. A motor that is able to shift from constant torque mode to constant power mode with speed extending beyond the base speed can be utilized as a magnetic variable transmission. Conventionally, this may be accomplished through a transmission device. However, transmission devices result in inefficiencies and additional costs. What is needed is a motor that can switch between a high torque low speed configuration and a low torque high speed configuration.

SUMMARY

In response to these and other problems, there is presented various embodiments disclosed in this application, including methods and systems of arranging permanent magnets to switch from a first configuration designed for a first torque output to a second configuration designed for a second torque output.

These and other features, and advantages, will be more clearly understood from the following detailed description taken in conjunction with the accompanying drawings. It is important to note the drawings are not intended to represent the only aspects of the invention.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding conventional control circuitry, power supplies, or circuitry used to power certain components or elements described herein are omitted, as such details are within the skills of persons of ordinary skill in the relevant art.

When directions, such as upper, lower, top, bottom, clockwise, or counter-clockwise are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Figure 1:
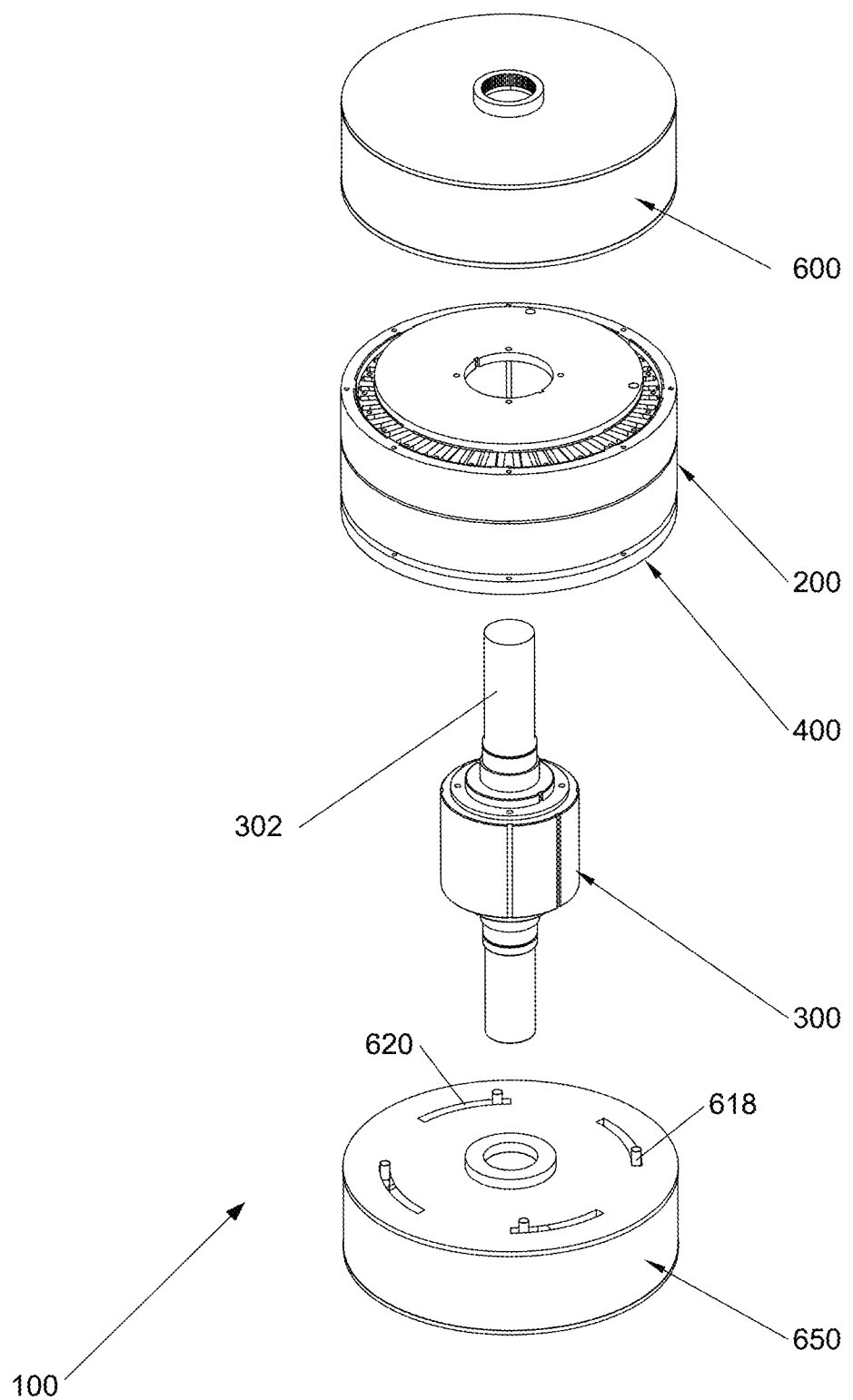
FIG. 1 is an exploded view of one embodiment of a motor/generator component according to certain aspects of the present disclosure.

FIG. 1 is an exploded perspective view of a motor/generator component 100 illustrating a magnetic disc assembly 400, a rotor hub 300, and a first actuating mechanism 600, which in certain embodiments, may be adapted to couple to one side of the magnetic disc assembly 400. In certain embodiments, there may also be a second actuating mechanism 650 adapted to couple to the opposing exterior side of the magnetic disc assembly 400.

The magnetic disc assembly 400 comprises a back iron circuit 200 which surrounds and positions a toroidal magnetic cylinder 430 (not shown). The toroidal magnetic cylinder 430 surrounds a coil assembly 500 (not shown). As will be explained below, in certain embodiments, the rotor hub 300 supports various components of the back iron circuit 200 and is coupled to a rotor shaft 302.

Figure 2A:
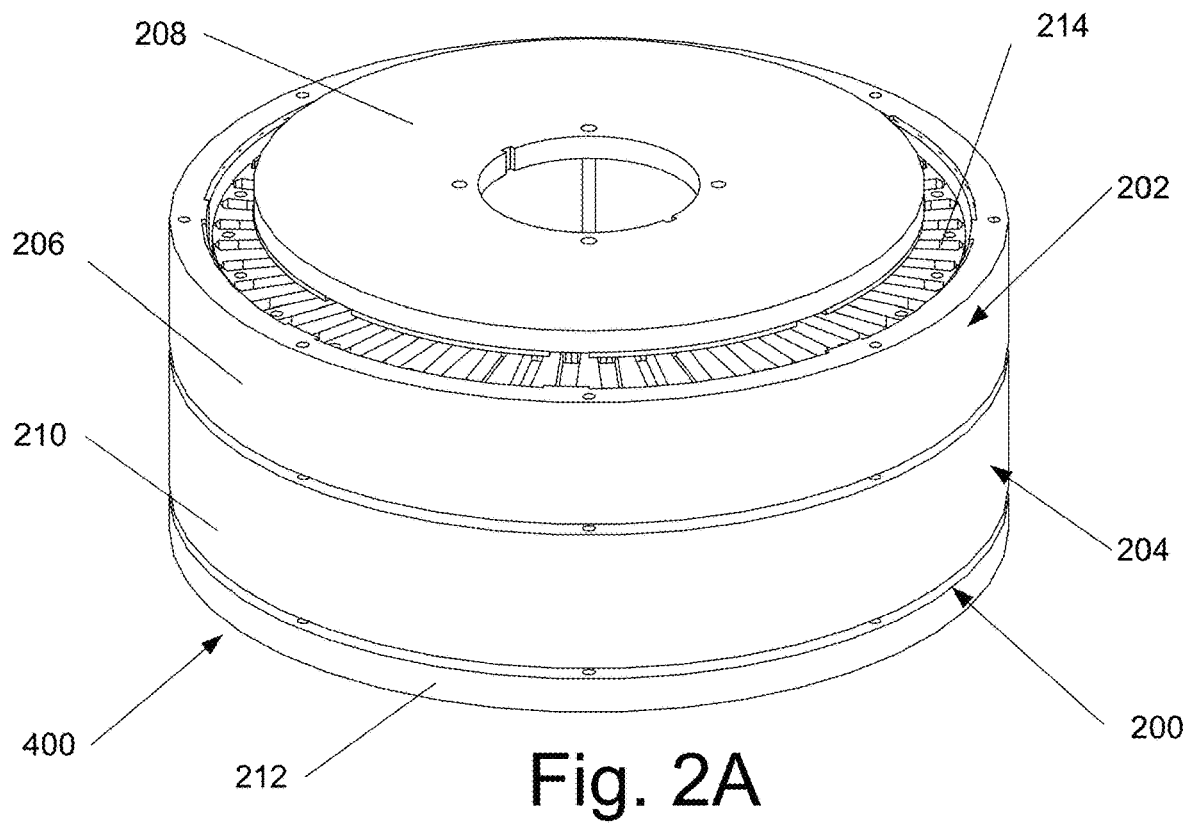
FIG. 2A is a detailed isometric view of a magnetic disc assembly of the motor/generator component illustrated in FIG. 1.

FIG. 2A is a detailed isometric view of the magnetic disc assembly 400. As illustrated in FIG. 2A, the back iron circuit 200 comprises the exterior of the magnetic disc assembly 400. In certain embodiments, the back iron circuit may be comprised of two portions. Relative to the page, the back iron circuit may comprise a first or top portion 202 and a second or bottom portion 204. In certain embodiments, the first portion 202 of the back iron circuit 200 comprises a first cylindrical wall 206 made of back iron material. For purposes of this application the term "back iron" may refer to iron or a soft magnetic material, such as any ferrous compound or alloy, any iron, nickel or cobalt alloy, or any laminated metal comprising laminated sheets of such material.

In certain embodiments, the first cylinder wall 206 may be coupled to a ring or flat side wall 208 which is also made of back iron material. As will be explained below, in yet other embodiments, the first cylinder wall 206 may rotate through a predetermined angle with respect to the flat wall 208. In either case, the side wall 208 is adjacent to the first cylindrical wall 206.

The second portion of the back iron circuit 204 comprises a second cylindrical wall 210, which in certain embodiments may be coupled to a second ring or flat side wall 212. As will be explained below, in yet other embodiments, the outer cylinder wall 210 may rotate through a predetermined angle with respect to the flat wall 212.

In certain embodiments, a slot 214 may be defined between the cylindrical wall 206 and the flat side wall 208 to allow the passage of control wires and/or electrical conductors or adding mechanical securement and support. In yet other embodiments, there may be a similar slot or gap defined between the cylindrical wall 206 and the cylindrical wall 210 (not shown in FIG. 2A).

Figure 2B:
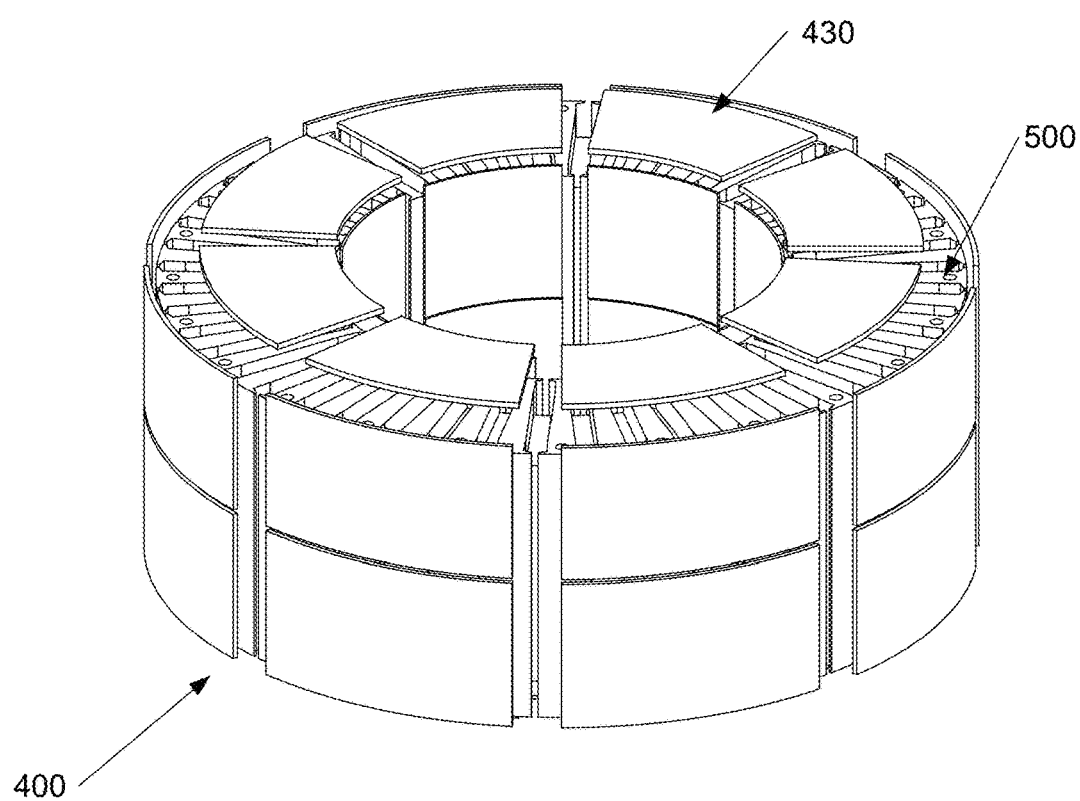
FIG. 2B is a detailed isometric view of a magnetic disc assembly illustrated in FIG. 2A with certain components removed for clarity.

FIG. 2B is a detailed isometric view of one embodiment of the magnetic disc assembly 400 with the back iron circuit removed for clarity. As illustrated and as will be described below, the back iron circuit positions and supports a toroidal magnetic cylinder 430 which surrounds the coil assembly 500.

Figure 3A:
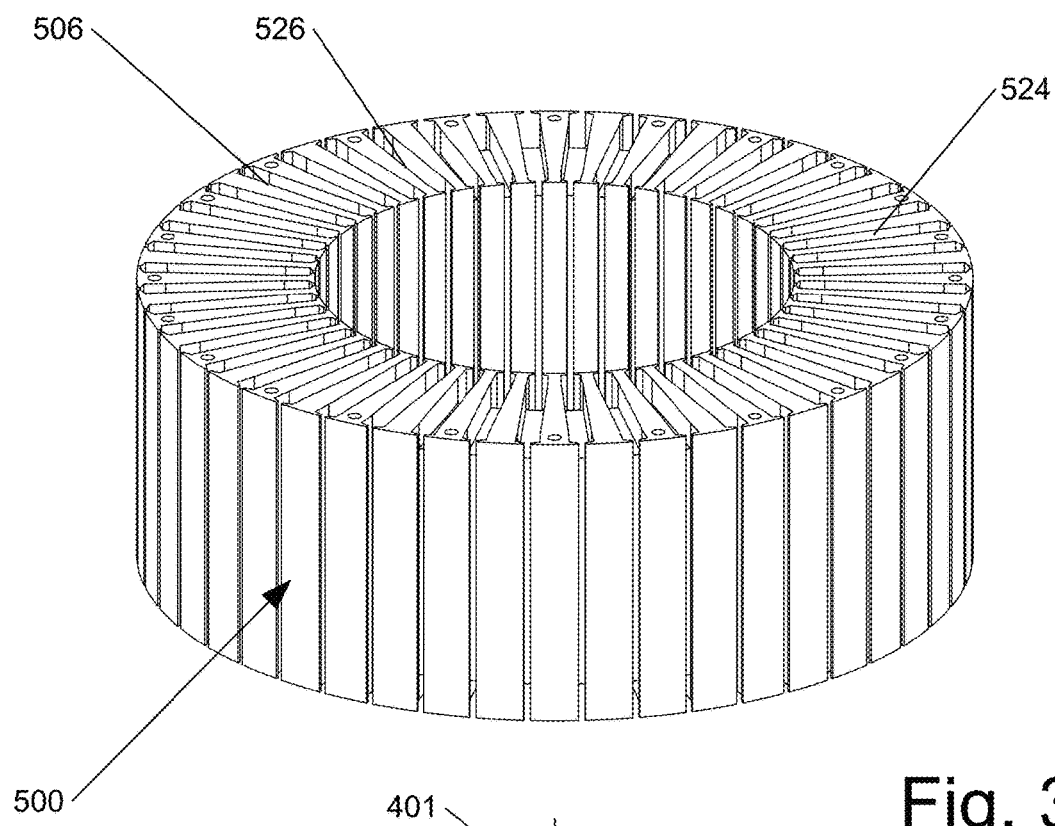
FIGS. 3A through 3E are various detailed illustrations of a coil assembly and components of the coil assembly.

FIG. 3A is a detailed isometric view of one embodiment of the coil assembly 500 with the toroidal magnetic cylinder 430 removed for clarity. In certain embodiments, the coil assembly 500 may be a stator in that the coil assembly may be stationary. In yet other embodiments, the coil assembly 500 may act as a rotor because the coil assembly may rotate. Furthermore, the embodiments illustrated depict only one way of configuring and supporting the coil assembly 500. In other embodiments the coil assembly 500 may be supported by support ring extending through a center slot between the outer cylindrical walls 206 and 210 (FIG. 2A) from the coil assembly to an exterior casing or housing. In yet other embodiments when the coil assembly 500 is functioning as a rotor, the coil assembly may be supported by a support ring extending through a center slot between the inner cylindrical walls 207 and 211 (FIG. 4B) from the coil assembly to the a shaft. The exact configuration depends on design choices as to whether the coil assembly is to be the stator or the rotor.

Generally, as is typically used in the industry, a "rotor" may be that portion or portions containing permanent magnets (regardless of whether the rotor is stationary or moving). In the illustrated embodiment, the coil assembly 500 is a portion of a stator used in conjunction with a rotor (or rotors) formed by the toroidal magnetic cylinder 430 (see FIG. 2B).

Figure 3B:
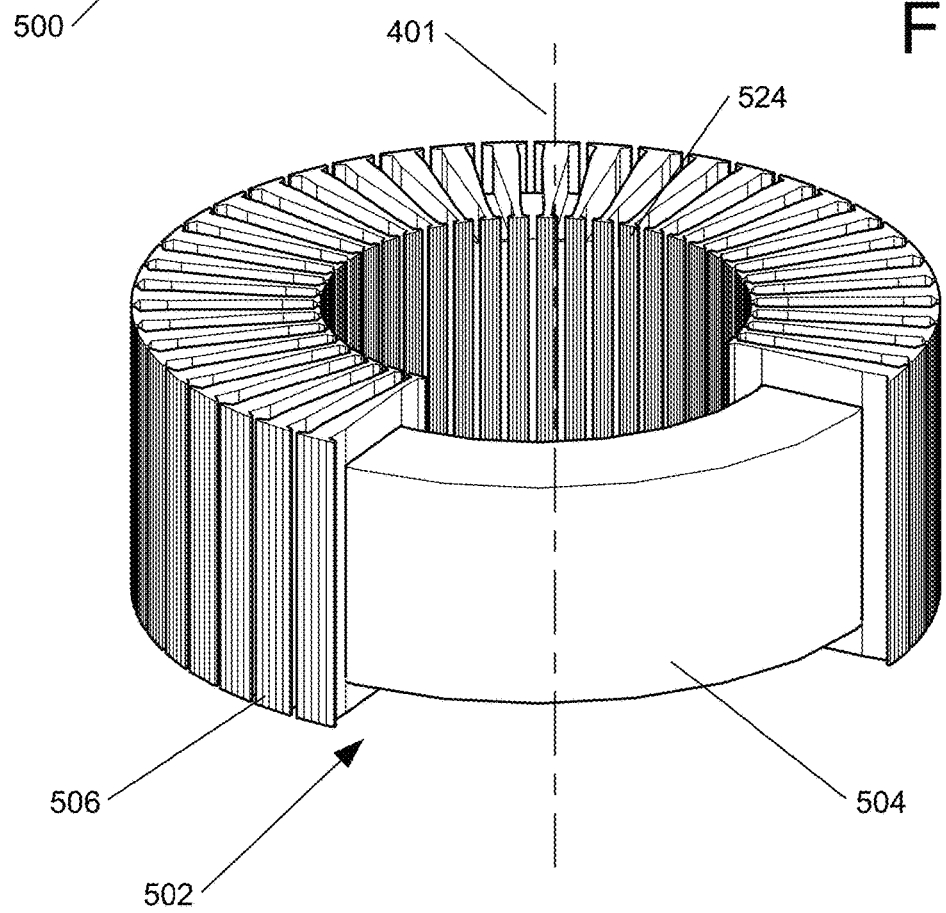

FIG. 3B illustrates a coil assembly support 502 which comprises a cylindrical or ring core 504 coupled to a plurality of teeth 506 radially spaced about the ring core with respect to a longitudinal or axial axis 401. For purposes of clarity, FIG. 3B shows a portion of teeth 506 removed so that the ring core 504 is visible.

In certain embodiments, the ring core 504 may be made out of iron, soft magnetic materials, or back iron materials, so that it will act as a magnetic flux force concentrator. However, other core materials maybe used when design considerations such as mechanical strength, reduction of eddy currents, cooling channels, etc. are considered. As discussed above, back iron materials may be iron, an iron alloy, laminated steel iron, or soft magnet materials. In some embodiments, the ring core 504 may be hollow or have passages defined therein to allow liquid or air cooling.

Figure 3C:
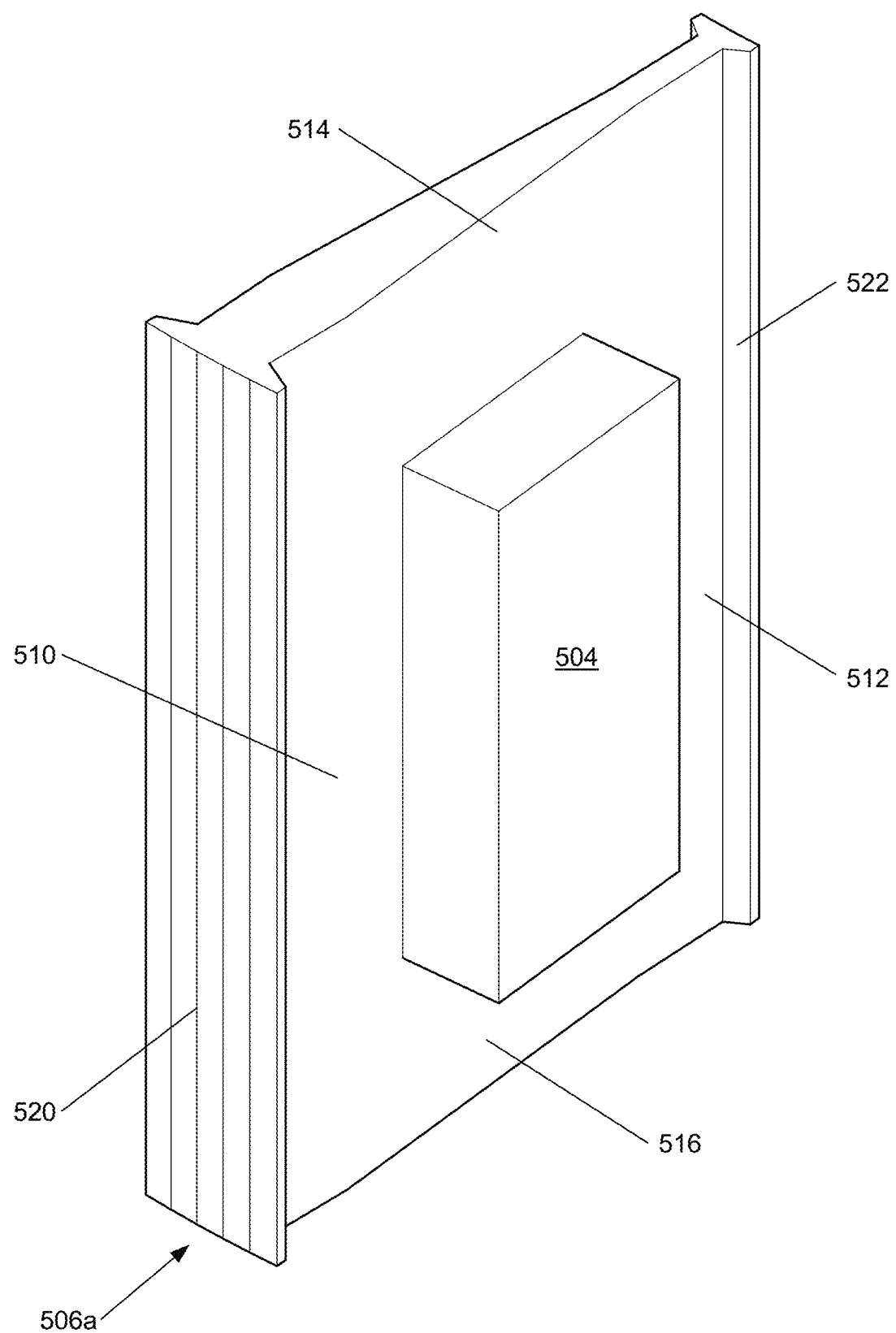

One embodiment of an individual tooth 506a and a small portion of the ring core 504 are illustrated in FIG. 3C. The tooth 506a may be made from a material similar to the material forming the core 504, for example, iron, laminated steel or soft magnetic material. In the illustrated embodiment, each tooth 506a extends from the ring core 504 in radial (e.g., horizontal) and longitudinal (e.g., vertical) directions. Thus, each tooth 506a comprises an outer portion 510 extending radially away from the longitudinal axis 401 (FIG. 3B), an inner portion 512 extending radially toward the longitudinal axis 401, a top portion 514 extending in one longitudinal or axial direction, and a bottom portion 516 extending in the opposing vertical or longitudinal direction. The illustrated portion of the ring core 504 is coupled to and supports the individual tooth 506a.

In certain embodiments, an exterior fin 520 couples to an exterior edge of the outer vertical portion 510 and extends outward from the vertical portion 510 in opposing circumferential (or tangential) directions with respect to the longitudinal axis 401. Similarly, an interior fin 522 couples to an interior edge of the inner portion 512 and extends outward from the portion 512 in opposing circumferential (or tangential) directions. As used in this disclosure, the term "circumferential direction" means the tangential or rotational direction about an axis, such as axis 401 (See FIG. 3B).

Figure 3D:
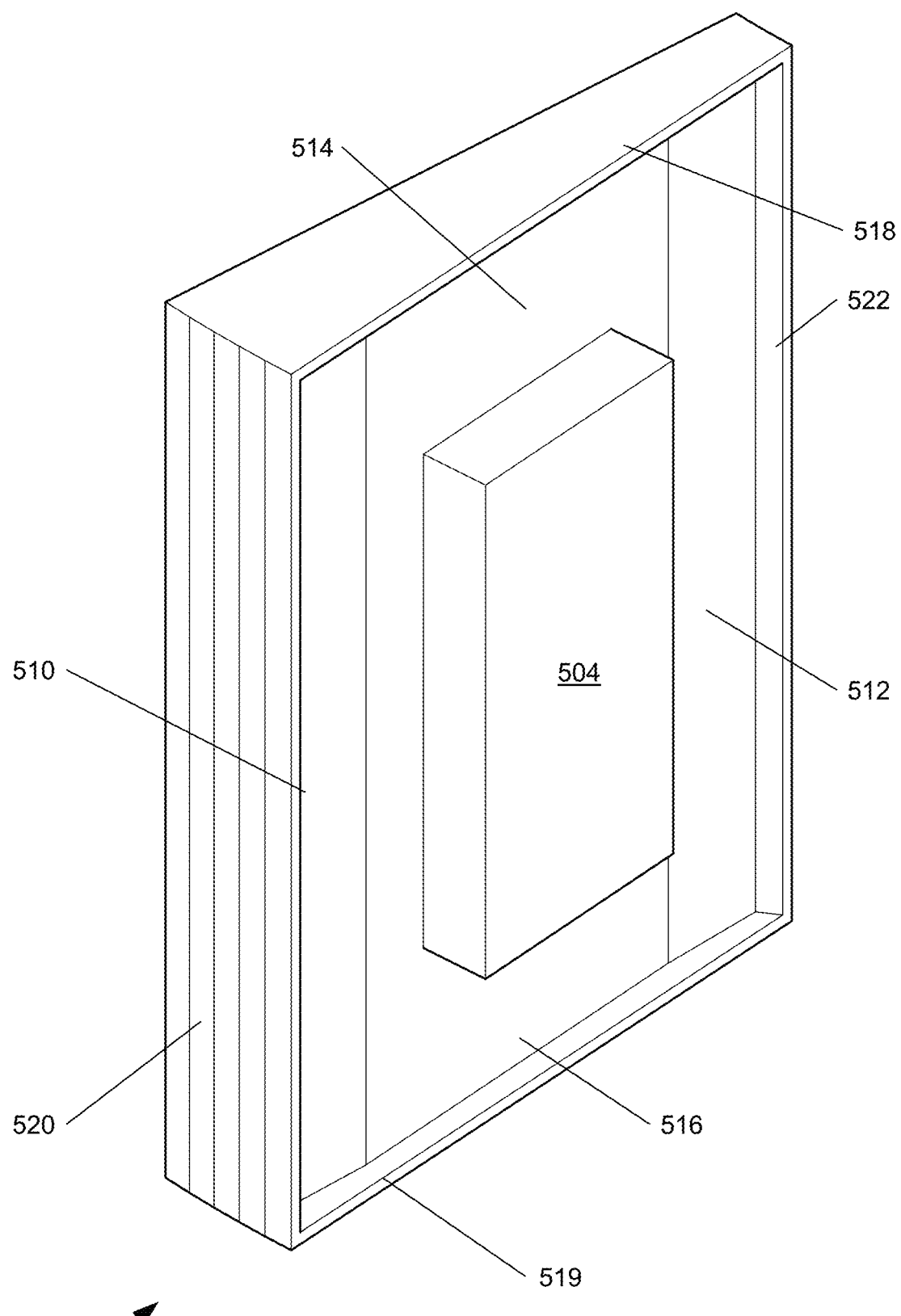

An alternative embodiment of an individual tooth 506'a and a small portion of the ring core 504 are illustrated in FIG. 3D. The tooth 506'a is similar to the tooth 506a described above in reference to FIG. 3C except that the tooth 506'a also has horizontal or radial fins extending from the top portion 514 and the lower portion 516. Specifically, a first or top horizontal fin 518 extends in opposing horizontal circumferential directions from an edge of the top horizontal portion 514. Similarly, a second or bottom horizontal fin 519 extends in opposing horizontal circumferential directions from an edge of the bottom horizontal portion 516. In other words, the top horizontal fin 518 joins the top portion of the exterior fin 520 to the top portion of the interior fin 522. Similarly, the bottom horizontal fin 519 joins a lower portion of the exterior fin 520 to a lower portion of the interior fin 522. From a structural perspective, the thickness of the fins 518 and 519 maybe thicker closer to the joint with the respective horizontal members 514 and 516 and tapers as the fins extend away from the joints.

Figure 3E:
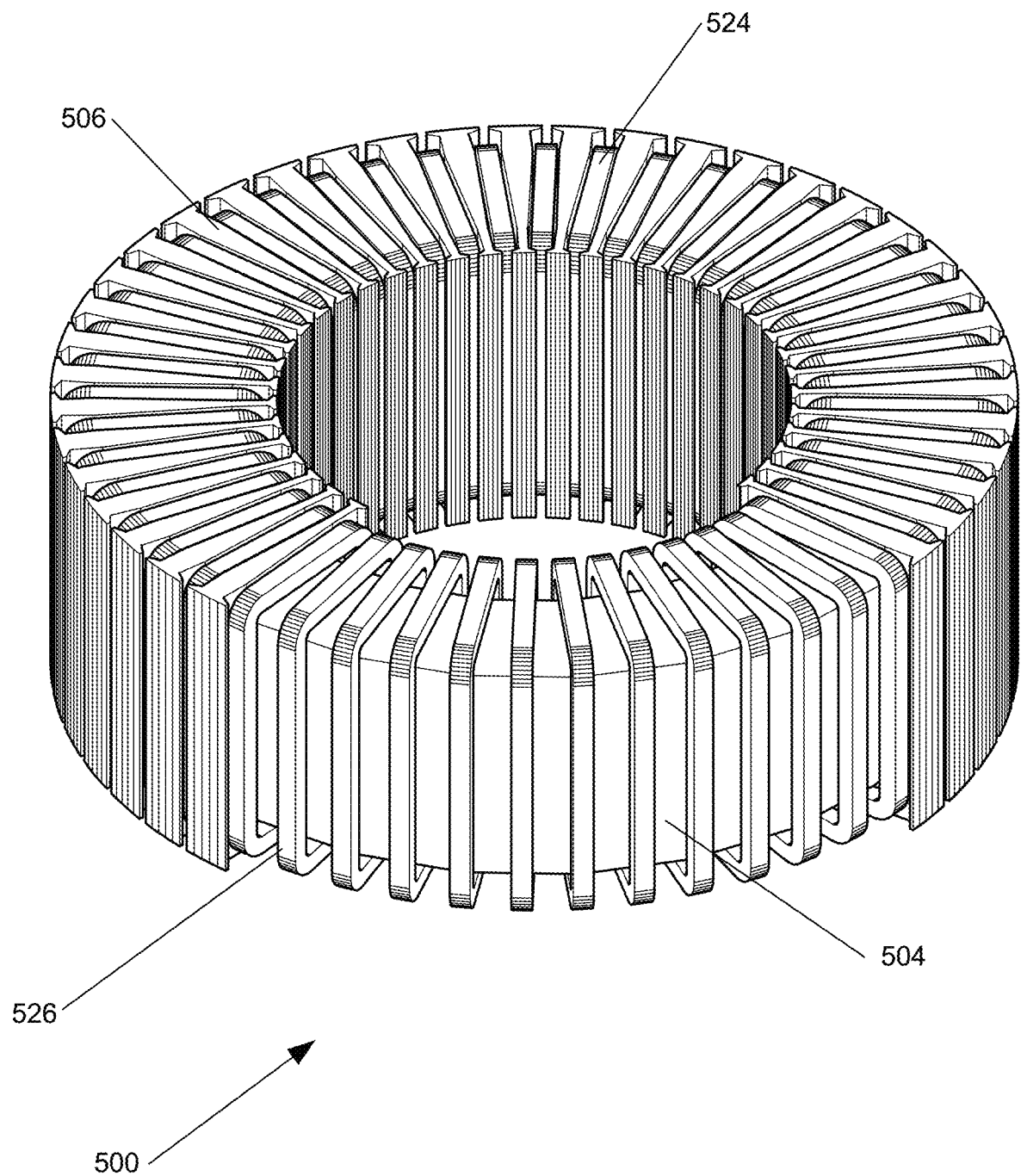

Adjacent teeth 506 or 506' supported by the core ring 504 form radial slots 524 within the coil assembly support structure 502, as illustrated in FIG. 3A. FIG. 3E (which omits a portion of the teeth 506 for clarity) illustrates a plurality of individual coils or coil windings 526 positioned radially about the ring core 504 and within the slots 524 formed between the adjacent teeth 506 or 506'. In contrast, FIG. 3A illustrates a complete coil assembly 500 showing all of the individual teeth 506 and individual coil windings 526 positioned within the individual slots 524.

Each individual coil 526 in the coil assembly 500 may be made from a conductive material, such as copper (or a similar alloy) wire and may be constructed using conventional winding techniques known in the art. In certain embodiments, concentrated windings may be used. In certain embodiments, the individual coils 526 may be essentially cylindrical or rectangular in shape being wound around the ring core 504 having a center opening sized to allow the individual coil 526 to be secured to the core 504.

By positioning the individual coils 526 within the slots 524 defined by the teeth 506 or 506', the coils are surrounded by the more substantial heat sink capabilities of the teeth which, in certain embodiments, can incorporate cooling passages directly into the material forming the teeth. This allows much higher current densities than conventional motor geometries. Additionally, positioning the plurality of coils 526 within the slots 524 and between teeth 506 reduces the air gap between the coils. By reducing the air gap, the coil assembly 500 can contribute to the overall torque produced by the motor or generator. In certain embodiments, the lateral fins 518 and 519 (FIG. 3D), the circumferential fins 520 and 522 (FIG. 3C or 3D) of the teeth 506a or 506'a of the coil assembly reduce the air gap between the structure of the coil to allow flux forces to flow from one fin to an adjacent fin when the coils are energized and the coil assembly 500 begins to move relative to the magnetic tunnel.

The number of individual coils 526 can be any number that will physically fit within the desired volume and of a conductor length and size that produces the desired electrical or mechanical output as known in the art. In yet other embodiments, the coils 526 may be essentially one continuous coil, similar to a Gramme Ring as is known in the art.

Figure 4A:
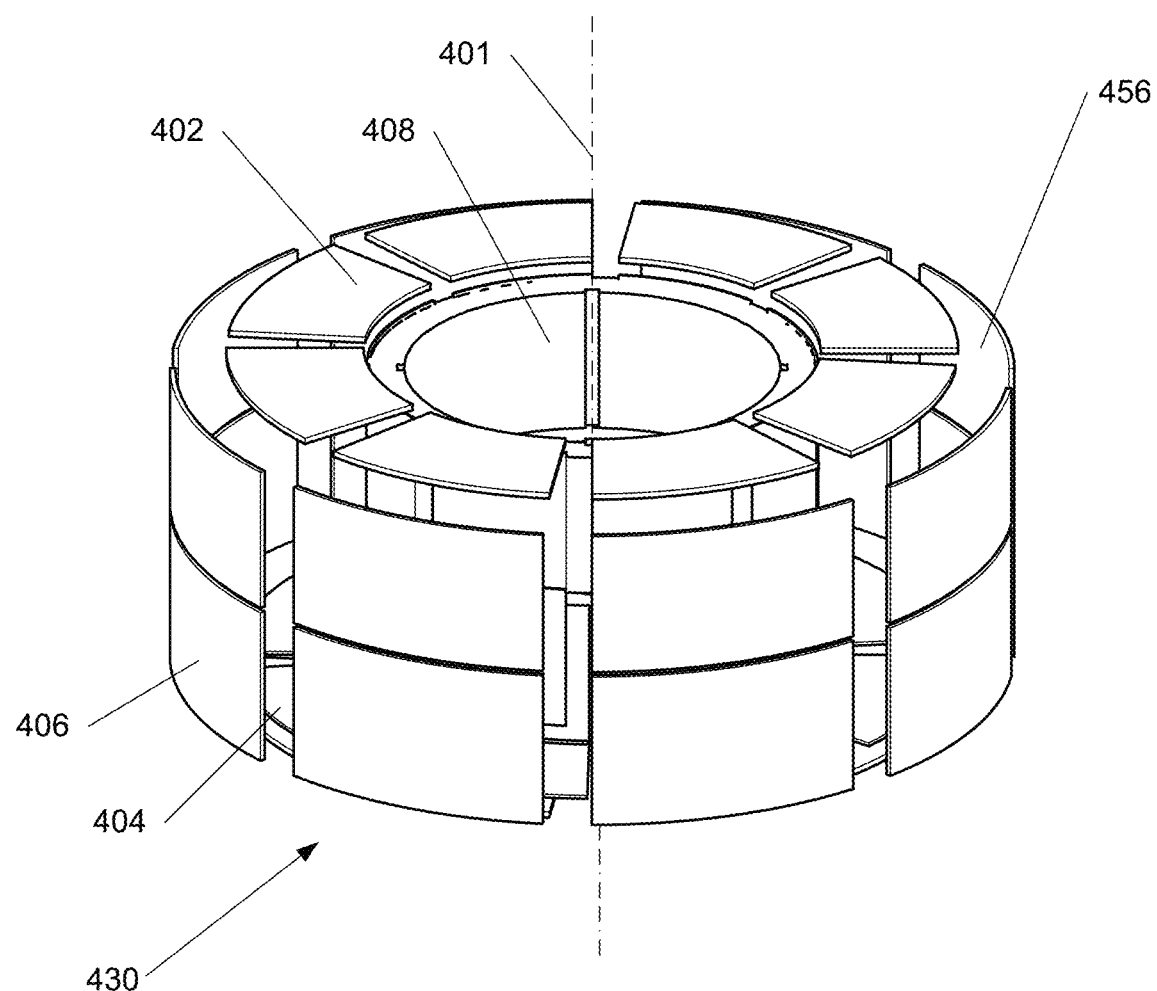
FIG. 4A is an isometric view of a magnetic toroidal cylinder or rotor assembly.

FIG. 4A illustrates one embodiment of the magnetic toroidal cylinder 430. There is a top or first side or radial wall of magnets 402 (first side wall 402) positioned about the longitudinal axis 401. Similarly, there is a bottom or second side or radial wall of magnets 404 (second side wall 404) positioned longitudinally away from the first side wall of magnets 402. An outer cylindrical wall or longitudinal ring of magnets 406 is longitudinally positioned between the first side wall 402 and the second radial wall of magnets 404. An inner cylindrical wall or longitudinal ring of magnets 408 is also longitudinally positioned between the first side wall 402 and the second radial wall of magnets 404 and laterally or radially positioned within the outer longitudinal ring of magnets 406. When assembled, the magnets forming the radial walls 402-404 and longitudinal walls 408-406 form the toroidal magnetic cylinder 430, such as illustrated in FIG. 4A. Each wall or ring may be made from a plurality of magnets. In industry parlance, each magnetic wall of permanent magnets is called a "rotor." Thus, a "four walled" magnetic toroidal cylinder may be known as a four rotor permanent magnet system.

In certain embodiments, the magnets forming the radial or side walls 402-404 and longitudinal cylindrical walls 408-406 discussed herein may be made of out any suitable magnetic material, such as: neodymium, Alnico alloys, ceramic permanent magnets, or electromagnets. The exact number of magnets or electromagnets will be dependent on the required magnetic field strength or mechanical configuration. The illustrated embodiment is only one way of arranging the magnets, based on certain commercially available magnets. Other arrangements are possible, especially if magnets are manufactured for this specific purpose.

In the illustrated embodiment of FIG. 4A, there may be slots between the walls, such as slot 456 between the outer longitudinal wall 406 and the top lateral or first side wall 402. As discussed above, in certain embodiments, there may also be slots within the walls, such as a slot which defined within the exterior cylindrical wall 406 (not shown). The slots are designed to accommodate a support structure and/or wires and conductors. The term "closed magnetic tunnel" as used in this disclosure refers to using a arrangement of the magnets forming the partial toroidal magnetic cylinder 430 that that "forces" or "bends" the flux forces from one side of the tunnel to the other (or in a circumferential direction) without first letting the magnetic forces escape through a large slot. Thus, the slot widths may be limited to keep flux forces from exiting through the slots. In other embodiments, additional magnets may be inserted into the slots to keep the flux forces channeled to a predetermined or a circumferential direction.

Figure 4B:
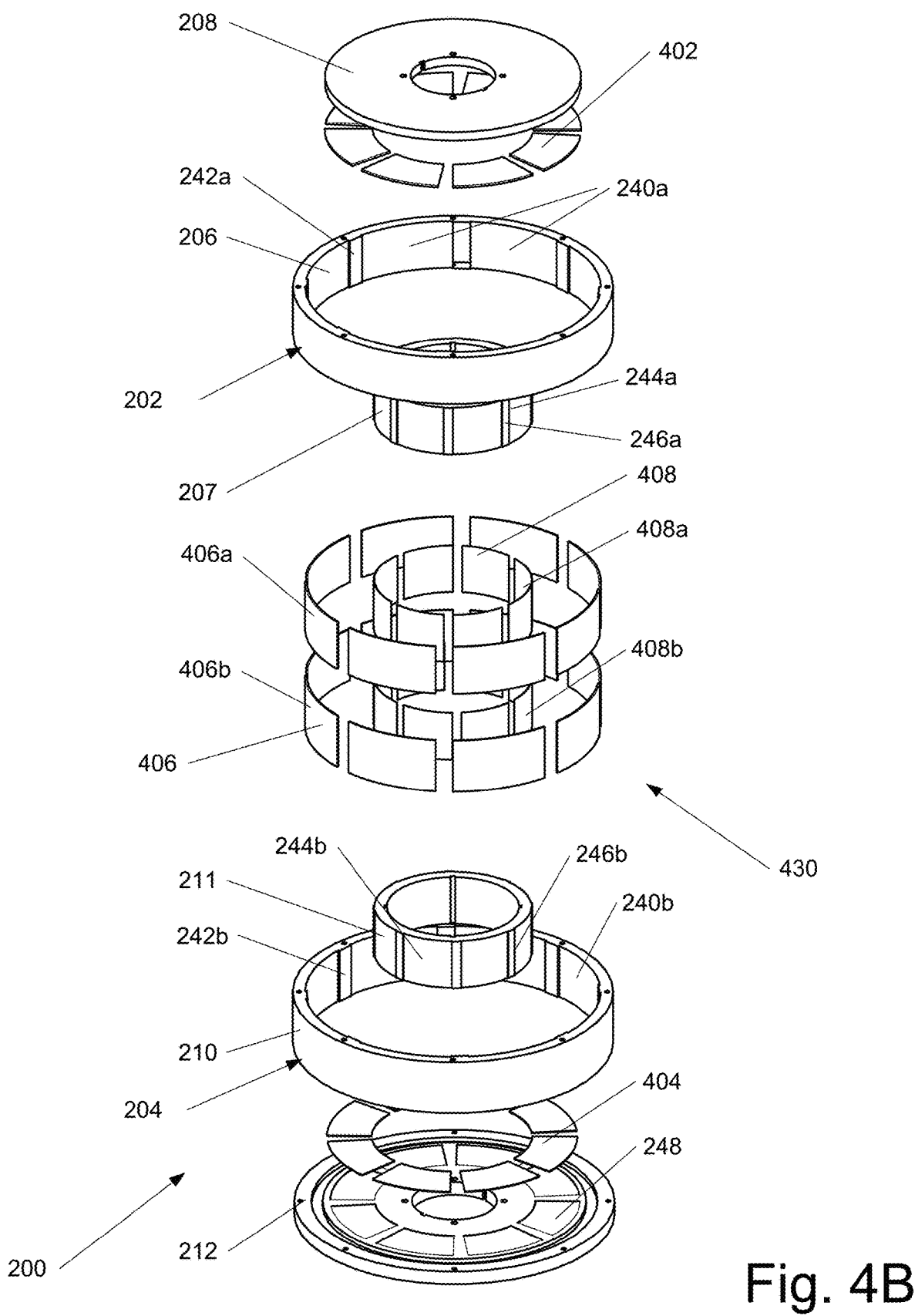
FIG. 4B is an exploded view of the magnetic toroidal cylinder of FIG. 4A and various components of a back iron system.

As discussed above, the magnets forming the toroidal magnetic cylinder 430 are positioned and supported by the back iron circuit 200. FIG. 4B is an exploded isometric view of the back iron circuit 200 and the magnets forming the toroidal magnetic cylinder 430. In this embodiment, the back iron circuit 200 comprises a first portion 202 and a second portion 204. The first portion of the back iron circuit 200 comprises the side or top wall 208, a first circumferential outer wall or ring 206, and a first interior wall or ring 207. The second portion 204 of the back iron circuit 200 comprises the side or bottom wall 212, the second circumferential outer wall or ring 210, and a second interior wall or ring 211.

In this embodiment, each outer wall or ring 406*a* and 406*b* comprises a plurality of curved magnets. A plurality of inner longitudinal grooves 240*a* are defined and radially spaced around an inner surface 242*a* of the first outer cylinder wall 206 of the back iron circuit 200. The plurality of outer magnets forming the first portion 406*a* of the outer magnetic wall 406 are sized to fit within the plurality of inner longitudinal grooves 240*a*. Similarly, a plurality of inner longitudinal grooves 240*b* are defined and radially spaced around an inner surface 242*b* of the second outer cylinder wall 210. The plurality of outer magnets forming the second portion 406*b* of the outer magnetic wall 406 are sized to fit within the plurality of inner longitudinal grooves 240*b*.

Each inner magnetic ring or wall portion 408*a* and 408*b* also comprises a plurality of curved magnets. A plurality of outer longitudinal grooves 244*a* are defined and radially spaced around an outer surface 246*a* of the first inner cylinder wall 207 of the back iron circuit 200. The plurality of inner magnets forming the first portion 408*a* of the inner magnetic wall 408 are sized to fit within the plurality of outer longitudinal grooves 244*a*. Similarly, a plurality of outer longitudinal grooves 244*b* are defined and radially spaced around an outer surface 246*b* of the second inner cylinder wall 211. The plurality of inner magnets forming the second portion 408*b* of the inner magnetic wall 408 are sized to fit within the plurality of outer longitudinal grooves 244*b*.

Thus, the plurality of grooves 240*a*, 240*b*, 244*a* and 244*b* are designed to position and structurally support the plurality of magnets forming the outer cylindrical magnetic wall 406 and the inner cylindrical magnetic wall 408. Similarly, radial grooves 248 may be defined in an interior facing surface of the flat side walls 208 and 212 of the back iron circuit 200. The radial grooves 248 are also sized to accommodate and support the ring of radial magnets 404 (and radial magnets 402). In certain embodiments, adhesive materials known in the art may be used to fixedly couple the magnets forming the toroidal magnetic cylinder 430 to the various elements of the back iron circuit 200.

The embodiment illustrated in FIG. 4B uses two outer cylindrical walls 206 and 210. In other embodiments, the two outer cylindrical walls 206 and 210 may be replaced by a single cylindrical wall (not shown). Similarly, two inner cylindrical walls 207 and 211 are illustrated in FIG. 4*b*. However, in certain embodiments, the inner cylindrical walls 207 and 211 may be replaced by a single cylindrical inner wall (not shown).

In certain embodiments, the toroidal magnetic cylinder 430 may be divided into a plurality of radial segments; or as known in the art: "poles." For purposes of illustration, the toroidal magnetic cylinder 430 is divided into eight (8) radial segments, where adjacent segments have alternating magnetic polarity orientations. However, any number of radial segments may be used depending on specific design requirements for the motor or generator.

Figure 5A:
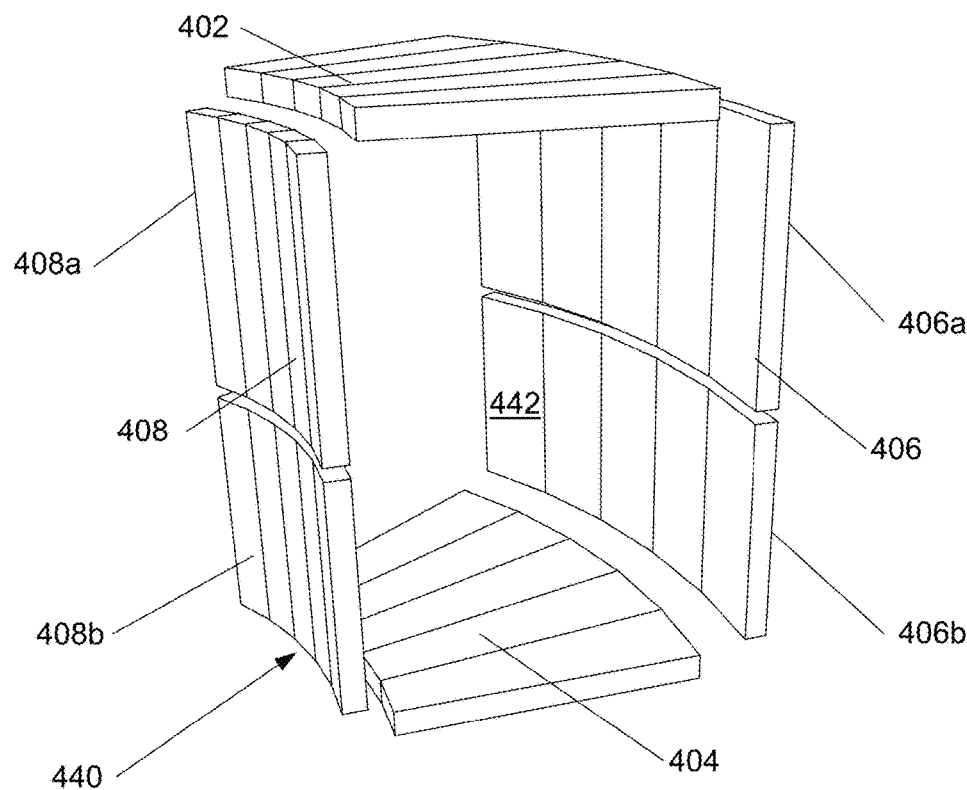
FIG. 5A is a detailed perspective view illustrating one embodiment of a magnetic cylinder segment.

One such radial segment 440 is illustrated in FIG. 5A. Each radial segment has an interior wall 408, an exterior wall 406, a top or first side wall 402, and lower or second side wall 404. As illustrated in FIG. 5A and discussed above in reference to FIG. 4B, the walls 406 and 408 my further be divided into two or more axial or longitudinal portions. For instance, the outer wall 406 in FIG. 5A comprises a first portion or wall 406*a* and a second portion or wall 406*b*. Similarly, the inner wall 408 comprises a first portion or wall 408*a* and a second portion or wall 408*b*.

Figure 5B:
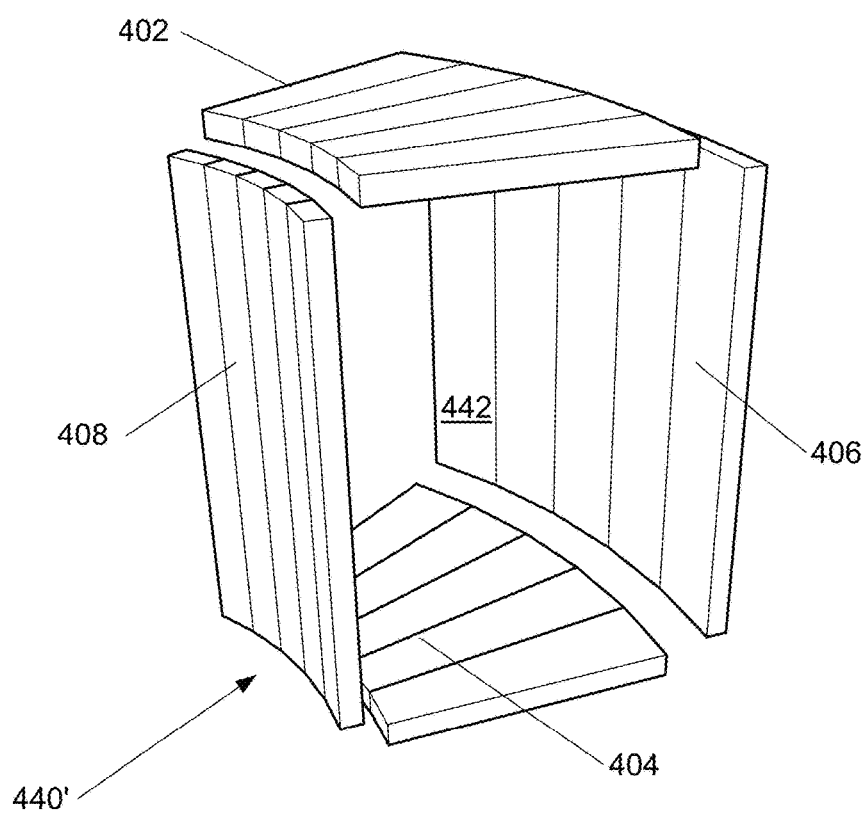
FIG. 5B is a detailed perspective view illustrating an alternative embodiment of a magnetic cylinder segment.

In contrast, the radial segment 440' of FIG. 5B illustrates an embodiment having a single magnetic exterior wall 406 and a single magnetic exterior wall 408. From an electrical-magnetic perspective, it makes little difference whether the axial walls 406 and 408 of the radial segment 440 are formed from a single curved magnet as illustrated in FIG. 5B or two or more curved magnets as illustrated in FIG. 5A. However, in certain embodiments, it may be more convenient from a mechanical perspective to use the radial segment 440 as illustrated in FIG. 5A or the radial segment 440' as illustrated in FIG. 5B.

Figure 5C:
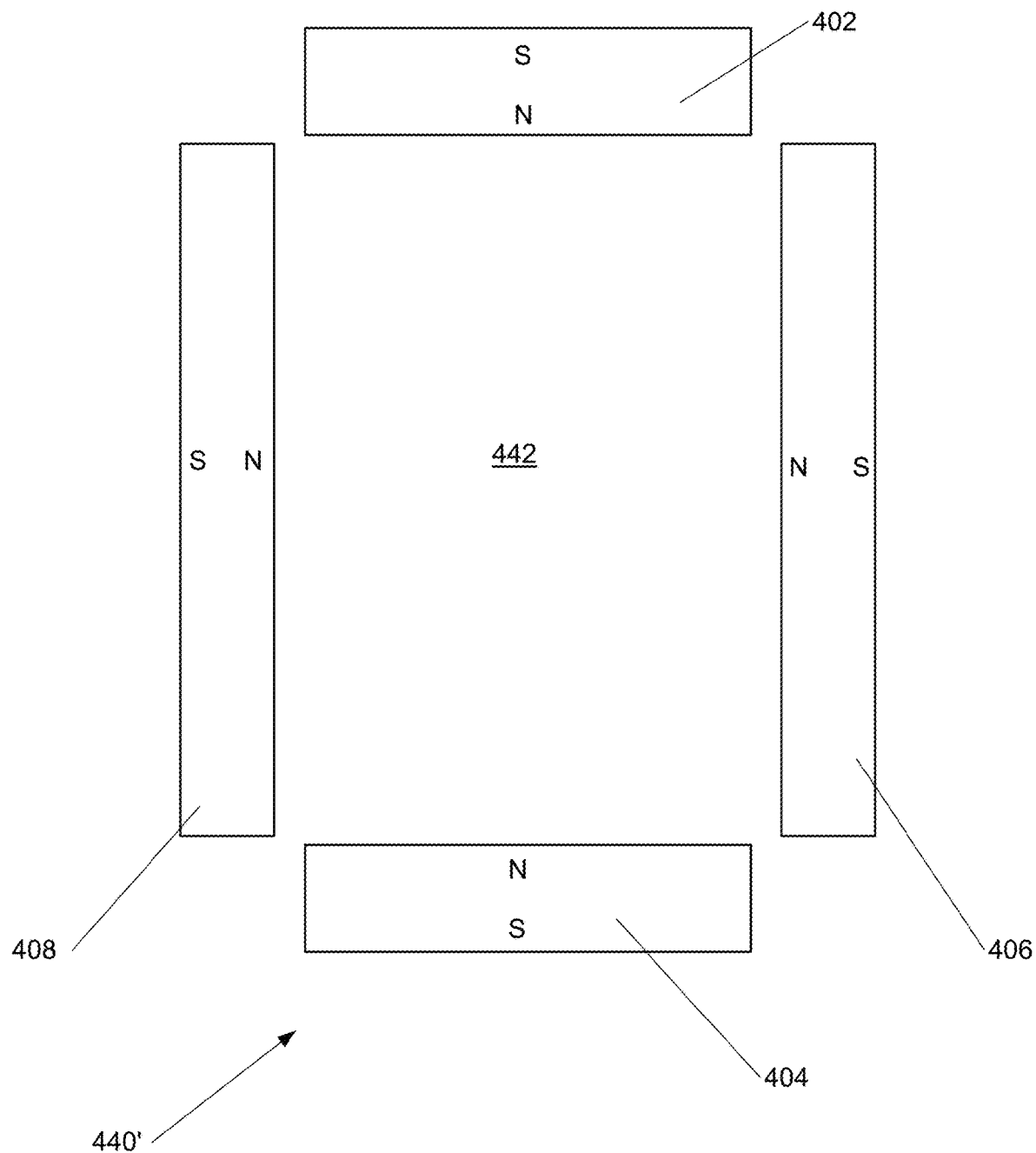
FIG. 5C is a section view of a magnetic cylinder segment illustrating one arrangement of magnetic poles.

The NNNN Magnetic Pole Configuration:

The individual magnets forming the magnetic walls of the radial segment 440 have their poles facing predetermined directions which affect the overall performance of the magnetic cylinder 400. To illustrate, FIG. 5C is a conceptual section view of the magnetic walls of radial segment 440' showing the magnetic pole orientation of the magnets forming the various walls of the radial segment. For instance, in FIG. 5C, the magnetic poles of the magnets forming the outer cylindrical wall 406 and the inner cylindrical wall 408 have their magnetic poles orientated along a radial direction with respect to the longitudinal axis 401 (FIG. 4A). In the illustration of FIG. 5C, the north magnetic poles of the cylindrical walls 406 and 408 point towards the interior 442 of the radial segment 440. Consequently, the south poles of the cylindrical walls 406 and 408 point away from the interior 442 of the radial segment 440. Similarly, the magnets forming the side walls 402 and 404 having their magnetic poles orientated along the longitudinal or axial direction such that their north poles also face towards the interior 442 of the radial segment 440. For purposes of this disclosure, the magnetic configuration illustrated in FIG. 5C may be thought of as a NNNN configuration because all of the poles pointing towards the interior 442 of the radial segment have a north magnetic polarity.

In certain embodiments, an adjacent radial segment has its magnetic poles orientated in an opposite direction or orientation to that of the radial segment 440. In other words, in the adjacent segment, the magnetic poles of the magnets forming the outer cylindrical wall 406 and the inner cylindrical wall 408 have their magnetic poles orientated along a radial direction pointing towards the longitudinal axis 401 (FIG. 4A) such that their south magnetic poles point towards the interior 442 of the radial segment 440. Similarly, the magnets forming the side walls 402 and 404 have their magnetic poles orientated along the axial or longitudinal direction such that their south poles also face towards the interior of the radial segment 440. Thus, an adjacent radial segment may have a SSSS magnetic pole configuration because all interior facing poles are of a south pole magnetic polarity.

The nomenclature of NNNN or SSSS is meant to indicate that all interior facing magnets have the same polarity. This nomenclature should not be taken to limit the claimed invention to four walls forming the magnetic segment. Although the example embodiment illustrates a four sided toroidal cylinder 430 where a cross section has four walls, it is within the scope of this invention to use three, five, six or even more wall segments to form a toroidal magnetic cylinder or similar shape.

Figure 5D:
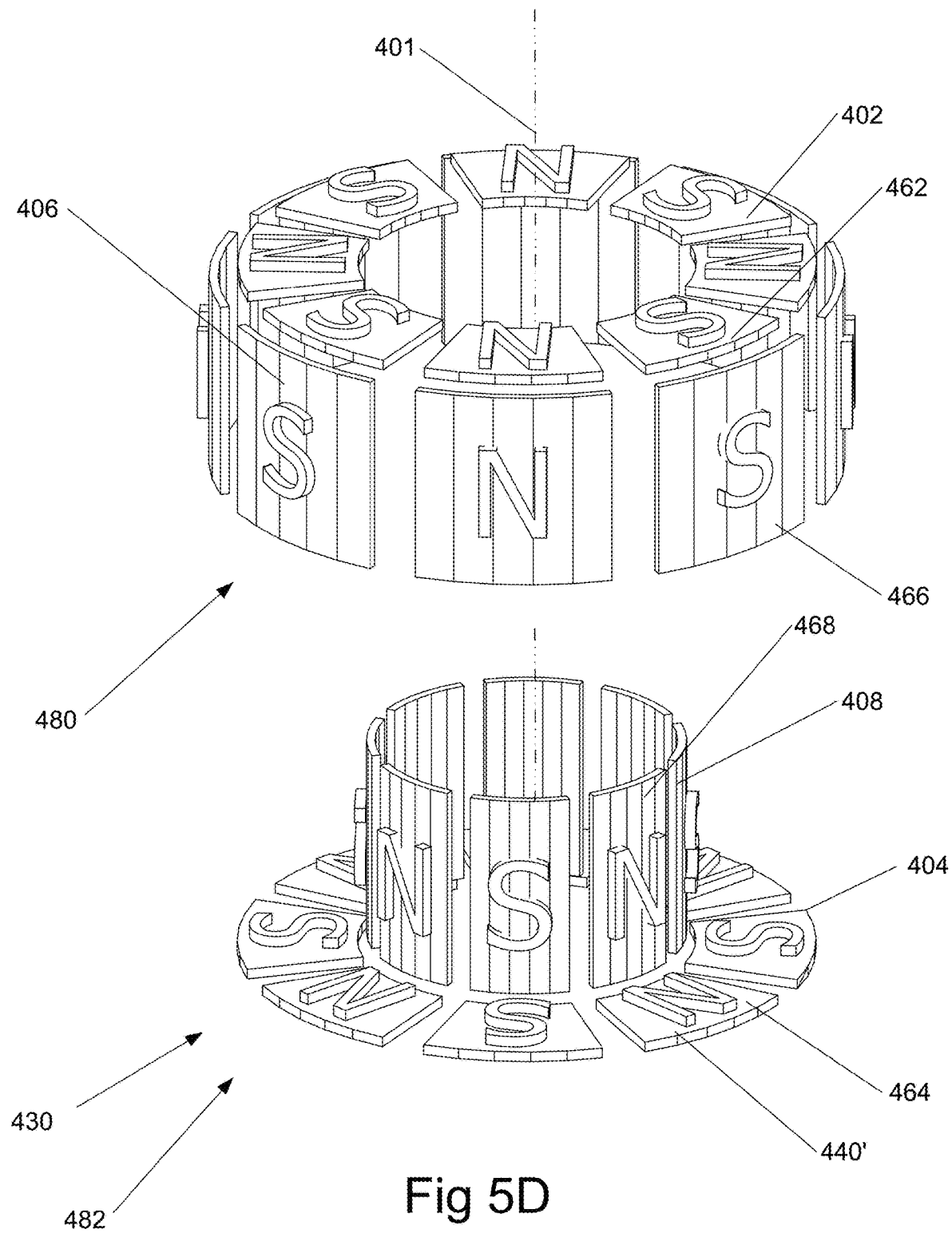
FIG. 5D is an exploded view of a toroidal magnetic cylinder illustrating the magnetic pole arrangement of FIG. 5C.

The radial segments forming the toroidal magnetic cylinder 430 alternate their magnetic pole orientation with each adjacent segment around the cylinder as illustrated in FIG. 5D. FIG. 5D is an exploded isometric view of the toroidal magnetic cylinder 430 showing the top ring or side wall 402 and the outer cylindrical wall 406 pulled away from the lower side wall 404 and inner cylindrical wall 408 so that the reader can visualize the magnetic pole orientation of the eight radial segments 440 forming this embodiment of the toroidal magnetic cylinder 430.

Figure 6:
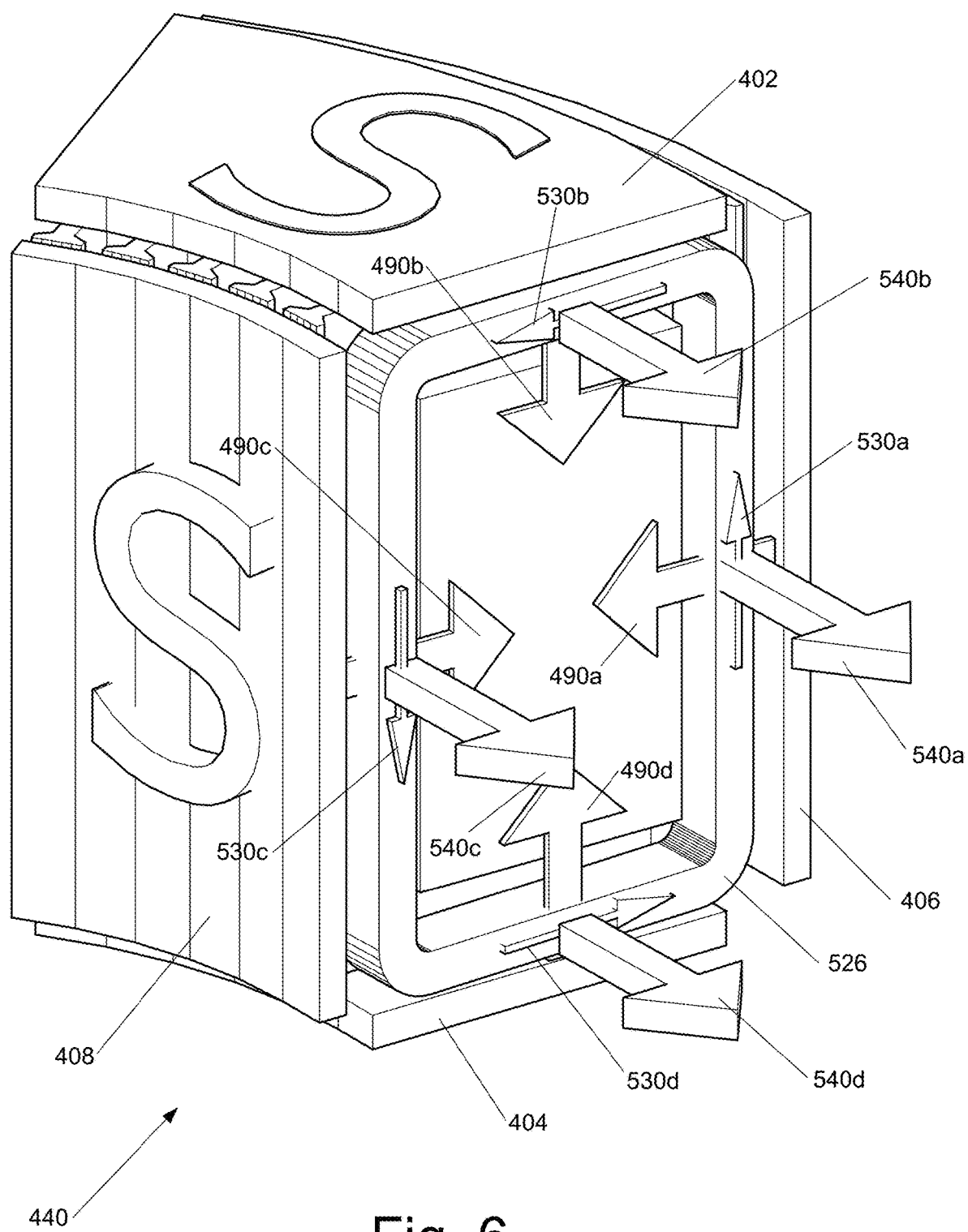
FIG. 6 is a detailed isometric view of a magnetic cylinder segment with electromagnetic forces imposed on the segment.

For example, the single radial segment 440' as illustrated in FIG. 5C may be formed by a top wall segment 462, a lower wall segment 464, an outer wall 466, and a lower wall 468 on FIG. 5D which are radially and axially aligned to form one segment (as illustrated in FIG. 6). For purposes of this disclosure, an "N" or a "S" is indicated on the face of the magnets to show the orientation of the magnetic poles of any particular wall a radial segment. As indicated by FIG. 5D, the "interior" side of the interior cylindrical wall 468 has an "N" defined thereon to indicate that the north pole of magnet or magnets forming that wall are facing the interior of the tunnel (and towards the viewer). The lower wall portion 464 also has an "N" defined thereon to indicate that the north pole is facing upwards towards the interior of the toroidal magnetic cylinder 430. In contrast, the upper side wall portion 462 has an "S" defined thereon to indicate that the south pole of the magnetic ring is facing the viewer—which also indicates that its north pole is facing away from the viewer and downwards toward the interior of the toroidal cylinder as illustrated in FIG. 5C. Similarly, the outer wall portion 466 has an "S" defined thereon to indicate that the south pole of the magnetic wall is facing the viewer—which also indicates that its north pole is facing away from the viewer towards the interior of the tunnel.

Thus, if a section was cut through the radial segment 440', the magnetic pole orientation of that particular radial segment would have all north poles (i.e., an NNNN magnetic pole configuration) facing towards the interior of the segment as illustrated in FIG. 5C. In contrast, the radial segments immediately adjacent to the radial segments 440' would have all of their south poles facing towards the interior of the segment (i.e., a SSSS magnetic pole configuration).

As will be explained below, the configuration of the toroidal magnetic cylinder 430 indicated by FIG. 5C and FIG. 5D is a first configuration (or NNNN magnetic pole configuration) which produces a relatively high torque when the toroidal magnetic cylinder 430 is used as part of the motor or generator.

The NSNS Magnetic Pole Configuration:

As described above, the magnets forming the toroidal magnetic cylinder 430 are positioned and supported by various components of the back iron circuit 200. Referring back to FIG. 4B, the upper side wall 208 of the back iron circuit 200 positions the magnets forming the magnetic wall 402. The lower side wall 212 positions the magnets forming the magnetic wall 404. The outer cylindrical walls 206 and 210 position the magnets forming the exterior magnetic wall 406. The interior cylindrical walls 207 and 211 positions the magnets forming the interior magnetic wall 408. So, when the first rotation actuator 600 (FIG. 1) rotates the upper side wall 208 and the second rotation actuator 650 (FIG. 1) rotates the lower side wall 212 in unison about the axis 401 with respect to the lower be the outer cylindrical walls 206 and 210 and the interior cylindrical walls 207 and 211, the plurality of magnets forming the upper magnetic side wall 402 and the lower magnetic side wall 404 will also be rotated. (Most likely, in such an embodiment, an outer cylindrical wall would replace both the outer cylindrical walls 206 and 210 of FIG. 4B or the outer cylindrical walls 206 and 210 would be joined to form one wall. Similarly, an interior cylindrical wall would replace both the interior cylindrical walls 207 and 211 of FIG. 4B).

As previously noted, in the example embodiment illustrated in the figures, there are eight radial magnetic segments 440 forming the toroidal magnetic cylinder 430—meaning the angular distance between the centers of the magnetic segments is 45 degrees. So, in the illustrative embodiment, if the upper side wall 208 and the lower side wall 212 are rotated 45 degrees with respect to the outer cylindrical walls 206 and 210 and the inner cylindrical walls 207 and 211, the magnetic side walls 402 and 404 would follow and also be rotated 45 degrees with respect to the magnets forming the inner and outer magnetic walls 408 and 406.

Figure 5E:
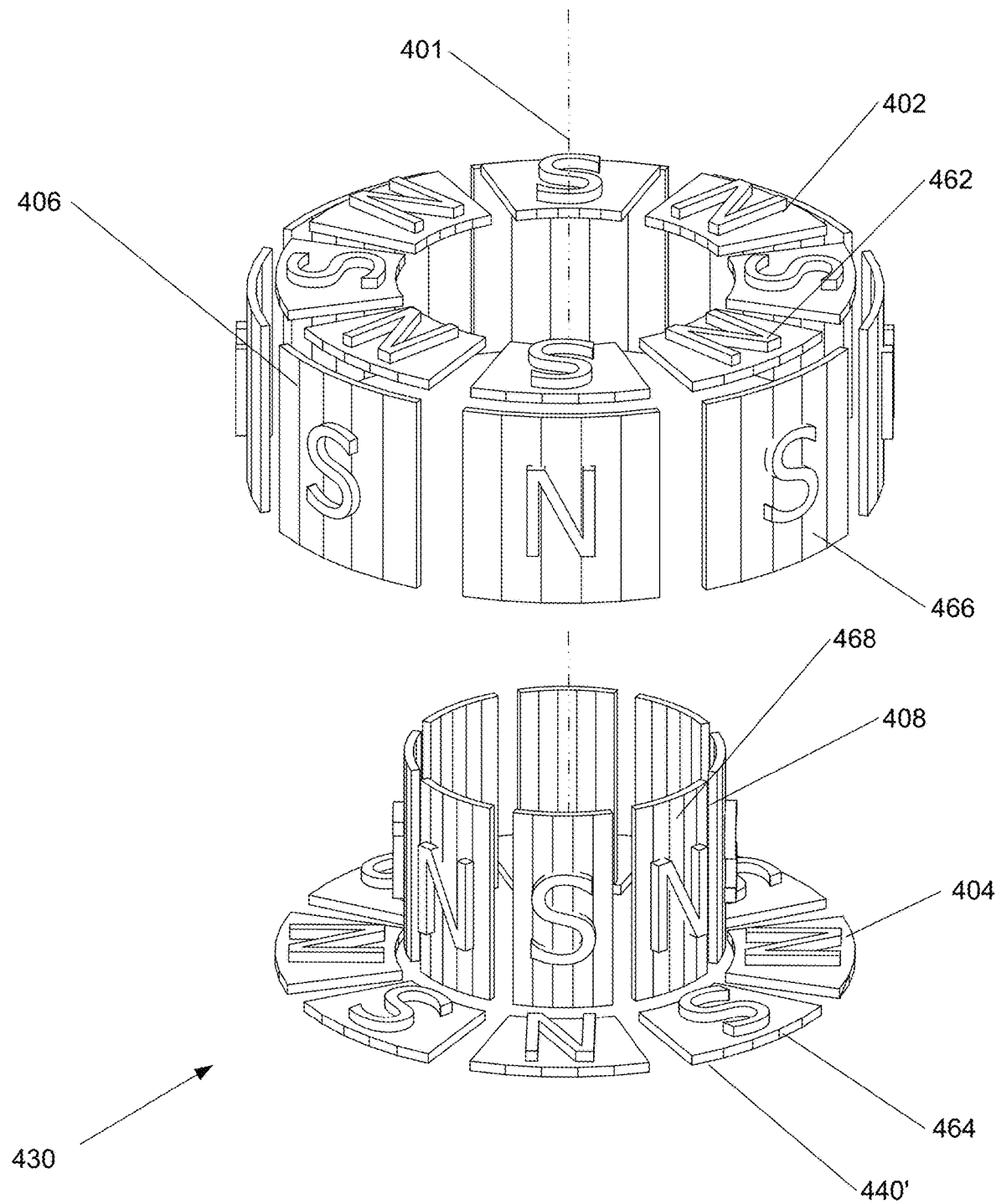
FIG. 5E is an exploded view of the toroidal magnetic cylinder illustrating the magnetic pole arrangement of FIG. 5F.
Figure 5F:
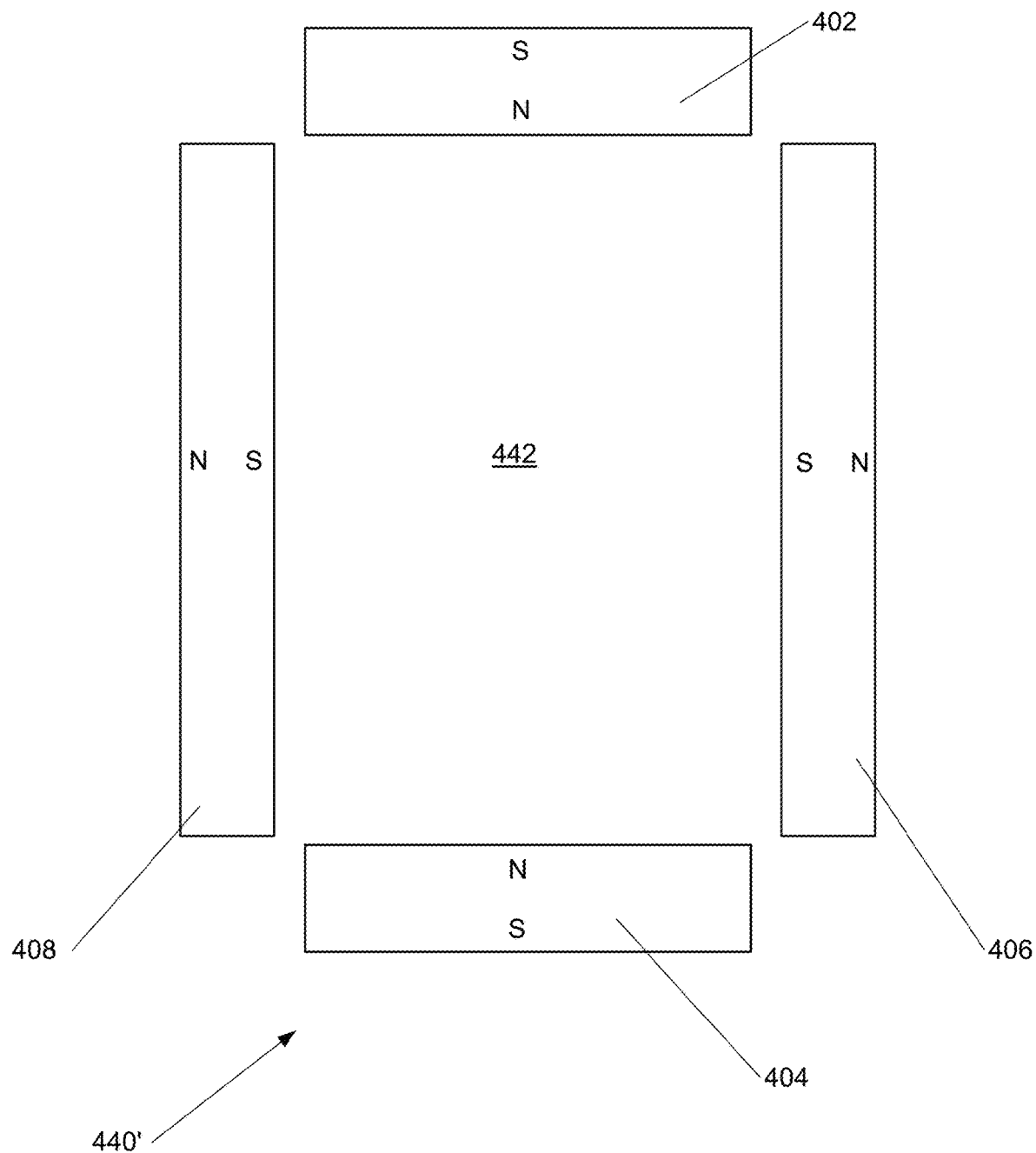
FIG. 5F is a section view of a magnetic cylinder segment illustrating an alternative arrangement of magnetic poles.

FIG. 5E is an exploded detailed isometric view of the toroidal magnetic cylinder 430 where the magnets forming the upper and lower side walls 402 and 404 have been rotated 45 degrees about the longitudinal axis 401 with respect to the magnets forming the inner and outer cylindrical walls 406 and 408 into a second magnetic configuration. FIG. 5F is a section view of the radial segment 440 after the rotation which shows the radial segment in a second configuration or "NSNS" magnetic pole configuration.

In FIG. 5F, the magnetic poles of the magnets forming the outer cylindrical wall 406 and the inner cylindrical wall 408 now have their magnetic poles orientated such that their south magnetic poles point towards the interior 442 of the radial segment 440. In contrast, the magnetic poles of the magnets forming the first side wall 402 and the lower side wall 404 have their magnetic poles orientated such that their north magnetic poles point towards the interior 442 of the radial segment 440. Thus, the second configuration is a NSNS magnetic pole configuration because adjacent magnetic interior faces alternate between having their south poles pointing towards the interior and their north poles pointing towards the interior. As indicated in FIG. 5E, adjacent radial segments would have the opposite magnetic pole orientation to the orientation illustrated in FIG. 5F.

As discussed below, once the rotation actuators 600 and 650 rotate the magnetic toroidal cylinder 430 into an NSNS magnetic orientation (as indicated by FIG. 5E and FIG. 5F) the magnetic toroidal cylinder 430 produces a lower torque than the first or NNNN magnetic configuration discussed above in reference to FIGS. 5D and 5C.

The NNSS Magnetic Configuration:

Referring back to FIG. 4B, if the upper side wall 208 and the cylindrical walls 206 and 210 were to be rotated in unison with respect to the lower side wall 212 and the interior cylindrical walls 207 and 211, they would necessary rotate the upper side magnetic wall 402 and outer magnetic cylindrical wall 406 with respect to the lower side magnetic wall 404 and the inner magnetic cylindrical wall 408.

In such an embodiment, the rotation actuator 600 may be coupled to the upper side wall 208 and the upper side wall may be coupled to the outer cylindrical wall 206. (Most likely, in such an embodiment, an outer cylindrical wall would replace both the outer cylindrical walls 206 and 210 of FIG. 4B or the outer cylindrical walls 206 and 210 would be joined to form one wall. Similarly, an interior cylindrical wall would replace both the interior cylindrical walls 207 and 211 of FIG. 4B.) As the rotation actuator 600 rotates, the rotation actuator will then move the upper side wall 208, which in turn, causes the outer cylindrical wall 206/210 to move with respect to the inner cylindrical wall 207/211 and the lower side wall 212. Alternatively, the rotation actuator 600 may be coupled to the lower side wall 212 to produce relative rotation between the lower side wall and inner cylindrical wall 207/211 and the upper side wall 208 and the outer cylindrical wall 206/210. Regardless of the placement of the rotation actuator, the effect is the same as the relative rotation produces a change in magnetic pole configuration. The resulting orientation is illustrated in FIG. 5G.

Figure 5G:
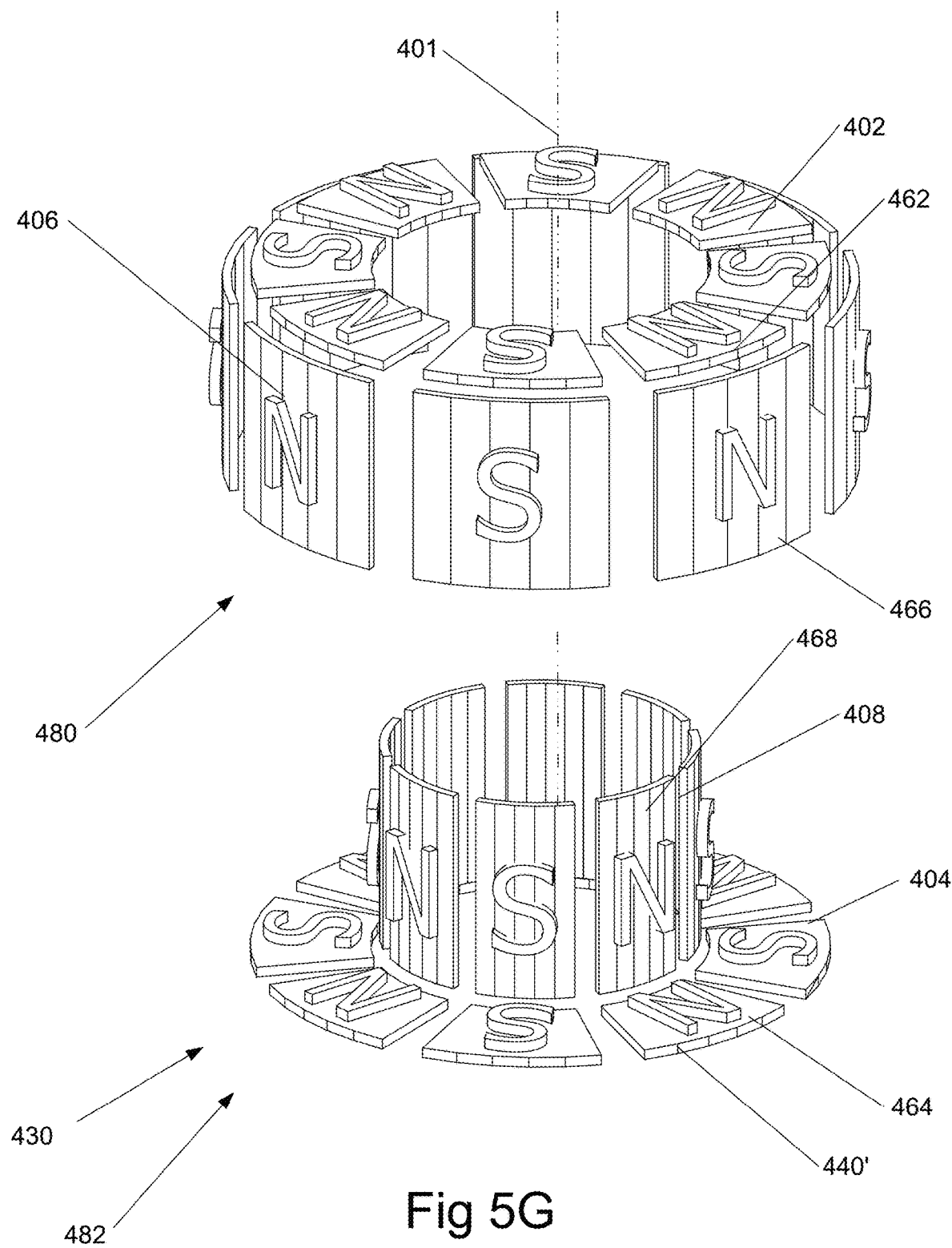
FIG. 5G is an exploded view of a magnetic cylinder illustrating the magnetic pole arrangement of FIG. 5H.
Figure 5H:
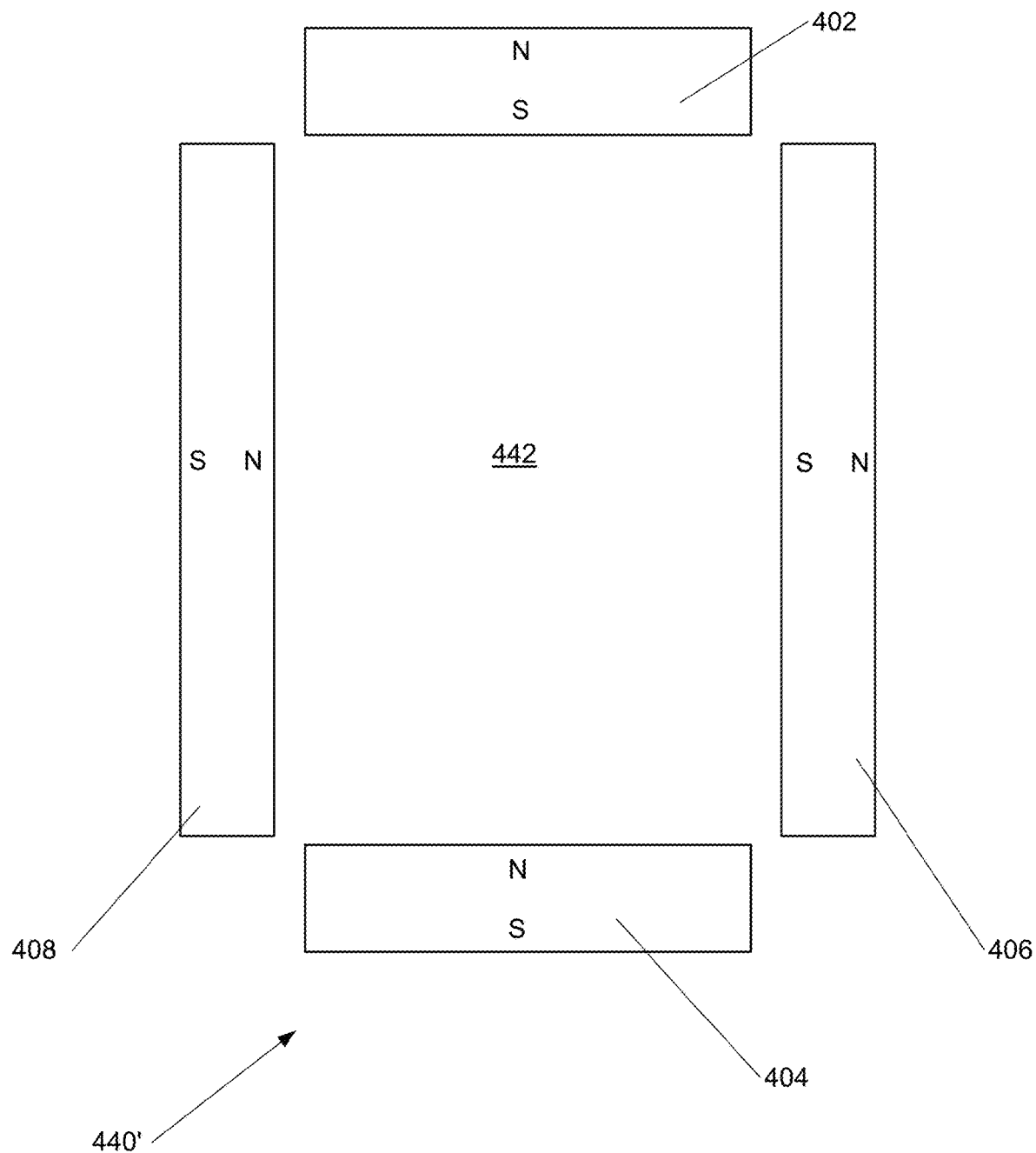
FIG. 5H is a section view of a magnetic cylinder segment illustrating an alternative arrangement of magnetic poles.

FIG. 5G is an exploded detailed isometric view of the toroidal magnetic cylinder 430 illustrating an additional magnetic pole configuration from the magnetic pole configuration illustrated in FIG. 5D. FIG. 5H is a section through the cylindrical segment 440' showing this second magnetic pole configuration where the magnetic poles of the magnets forming the outer cylindrical wall 406 and the top axial wall ring 402 now have their magnetic poles orientated such that their south magnetic poles point towards the interior 442 of the radial segment 440. In contrast, the magnetic poles of the magnets forming the inner cylinder wall 408 and the lower side wall 404 have their magnetic poles orientated such that their north magnetic poles pointing towards the interior 442 of the radial segment 440. Thus, this third magnetic configuration is a SSNN magnetic pole configuration because two adjacent magnetic faces have their south poles pointing towards the interior and two adjacent magnetic faces have their north poles pointing towards the interior.

As will be explained below, the third configuration or SSNN of the toroidal magnetic cylinder 430 indicated by FIG. 5G and FIG. 5H produces a lower torque than the NNNN magnetic configuration.

Comparison between Magnetic Configuration Types:

Turning now to FIG. 6, there is illustrated the magnetic cylinder segment 440 with a NNNN magnetic configuration. In other words, all magnets forming the walls of the magnetic cylinder segment 440 (top side wall 402, outer cylindrical wall 406, lower side wall 404, and inner cylindrical wall 408) have their north poles facing inwards towards the interior of magnetic cylinder segment. As is well known, the north magnetic poles will generate a magnetic flux. The direction of the magnetic flux at the interior surface of the magnets is represented by the arrows 490a, 490b, 490c and 490d all of which point to the interior of the segment 440.

A portion of the coil assembly 500 is also positioned within the interior of the magnetic cylinder segment (the rest of the coil assembly 500 has been removed for clarity). The coil assembly 500 supports an individual coil winding 526 as discussed above. In motor mode, a current is introduced into the coil winding 526. The current circulates and will take axial and radial directions as it rotates around the coil 526. The direction of the current is represented by arrows 530a-530d. As is well known, when a current flows in the presence of a magnetic field, a Laplace or Lorentz force may be created. According to the left hand rule, the force is perpendicular to the surface formed by the current and magnetic field. Since the magnetic fields generated by the permanent magnets also take radial and axial directions, the resulting force is expected to be in tangential direction (tangential axis is perpendicular to the surface formed by the radial and axial vectors).

For an NNNN magnetic configuration, the Lorentz force may be represented by the arrows 540a, 540b, 540c, and 540d. In other words, as current flows around each "leg" of the coil 526 in a magnetic field causes a Laplace or Lorentz force for that leg.

Effects of saturation and slots of the coil assembly can alter the exact force calculation, but a relative measurement of force (and the resulting torque) can be determined.

For instance, in an NNNN magnetic configuration, the total Lorentz force ("F") acting on the coil may be estimated by the following formula:

$$F = J \times B$$

$$F = I \cdot \vec{a}_z \times B \cdot \vec{a}_r \cdot l_1 + I \cdot \vec{a}_r \times -B \cdot \vec{a}_z \cdot l_2 + (-I \cdot \vec{a}_z) \times (-B \cdot \vec{a}_r) \cdot l_1 + (-I \cdot \vec{a}_r) \times (B \cdot \vec{a}_z) \cdot l_2$$

$$F = 2(IB)(l_2 + l_1)\vec{a}_\phi \quad (1)$$

Where:

I—is the current flowing through the coil 526

B—is the strength of the magnetic field acting on the current a—represents a hybridization factor and relates to the Laplace force and back emf $a_z$—is the hybridization factor in the axial or longitudinal direction $a_r$—is the hybridization factor in the radial direction $a_\phi$—is the hybridization factor in the radial direction $l_1$ is the width of the coil relative to the rotation axis (e.g. the vertical length of the coil 526 of FIG. 6)

$l_2$ is the depth of the coil relative to the rotational axis (e.g. the horizontal length of the coil 526 of FIG. 6).

In the above equations, every side or leg of the coil 526 contributes either negatively or positively and the torque contribution of each leg varies as a function of radius and a function of geometry. Thus, each coil leg has an additive or subtractive effect depending on magnet geometry and orientation.

In contrast to the NNNN magnetic configuration, the total average force for the NSNS magnetic configuration may be expressed as follows:

$$F = J \times B$$

$$F = I \cdot \vec{a}_z \times B \cdot \vec{a}_r \cdot l_1 + I \cdot \vec{a}_r \times B \cdot \vec{a}_z \cdot l_2 + (-I \cdot \vec{a}_z) \times (-B \cdot \vec{a}_r) \cdot l_1 + (-I \cdot \vec{a}_r) \times (-B \cdot a \vec{a}_z) \cdot l_2$$

$$F = 2(IB)(l_2 - l_1)\vec{a}_\phi \quad (2)$$

As can be observed, the force from equation (1) above is greater than the force from equation (2) which indicates the total force generated by the NNNN magnetic orientation is greater than the total force generated by the NSNS configuration—all else being equal. Because the magnetic cylinder segment 440 rotates about the longitudinal axis 401, the electromagnetic torque generated by a NNNN magnetic configuration is also greater than the electromagnetic torque generated by the NSNS magnetic configuration.

Figure 7A:
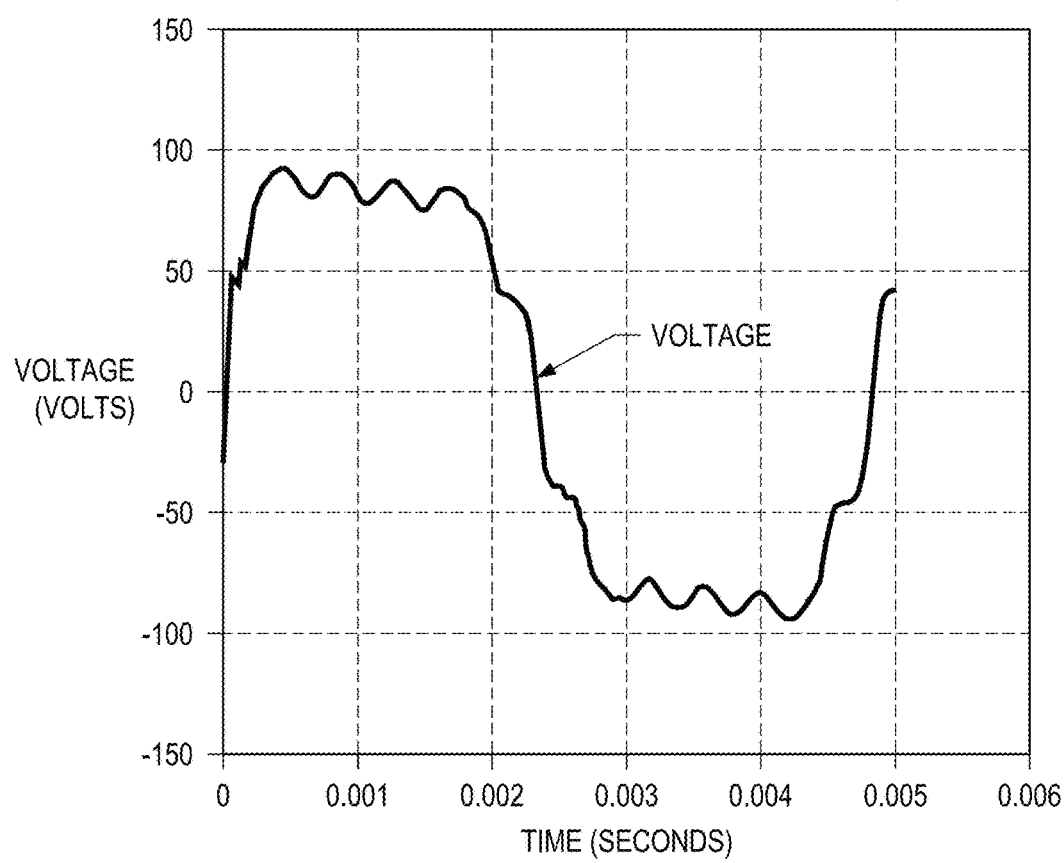
FIGS. 7A, 7B, and 7D are graphs illustrating the relative torque or back-emf voltages of the various magnetic pole arrangements of FIGS. 5C to 5H.
Figure 7B:
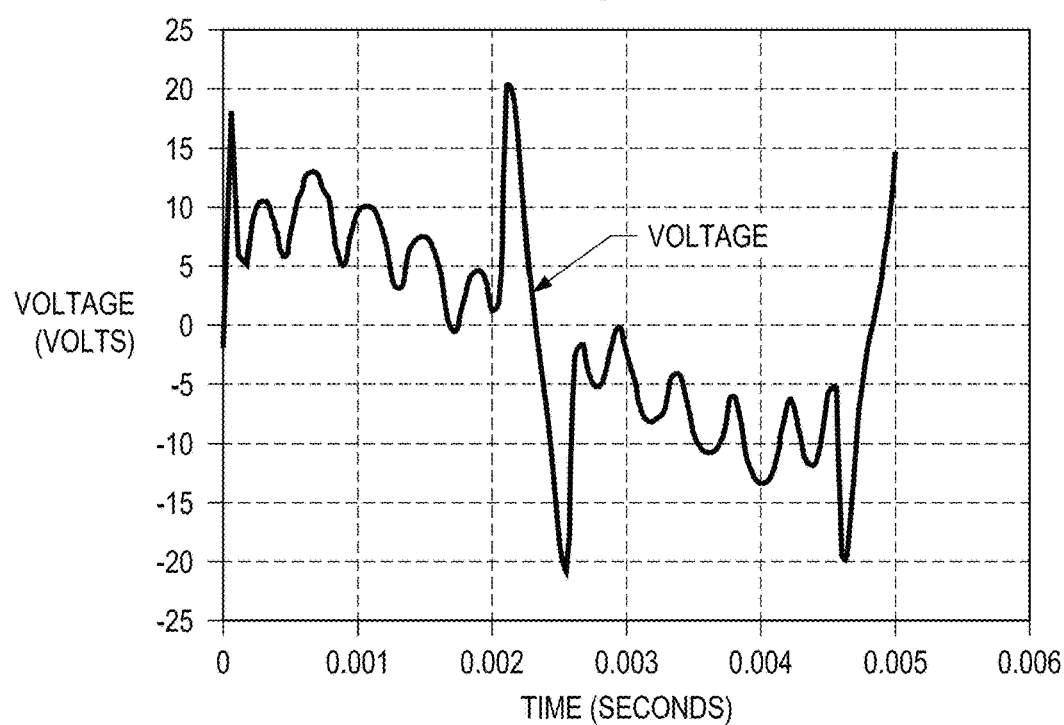

Finite Element Modeling can be performed on a radial segment to verify the above analysis. As is well known, a back electromotive force or back-EMF relates to the electromagnetic torque. Through finite element modeling, a graph of the back emf over time for the radial segment 440 having a NNNN magnetic configuration and running at 3000 rpm can be generated. The results are illustrated as FIG. 7A which illustrate the back EMF voltage from a DC current with a soft magnetic composite stator core (e.g. core 504) and a single turn (e.g. a single conductor) for the coil. A similar analysis may be performed for the radial segment 440 having a NSNS configuration. These results are illustrated as FIG. 7B which illustrates the back EMF voltage from a DC current with a soft magnetic composite stator core and a single turn for the coil.

Figure 7C:
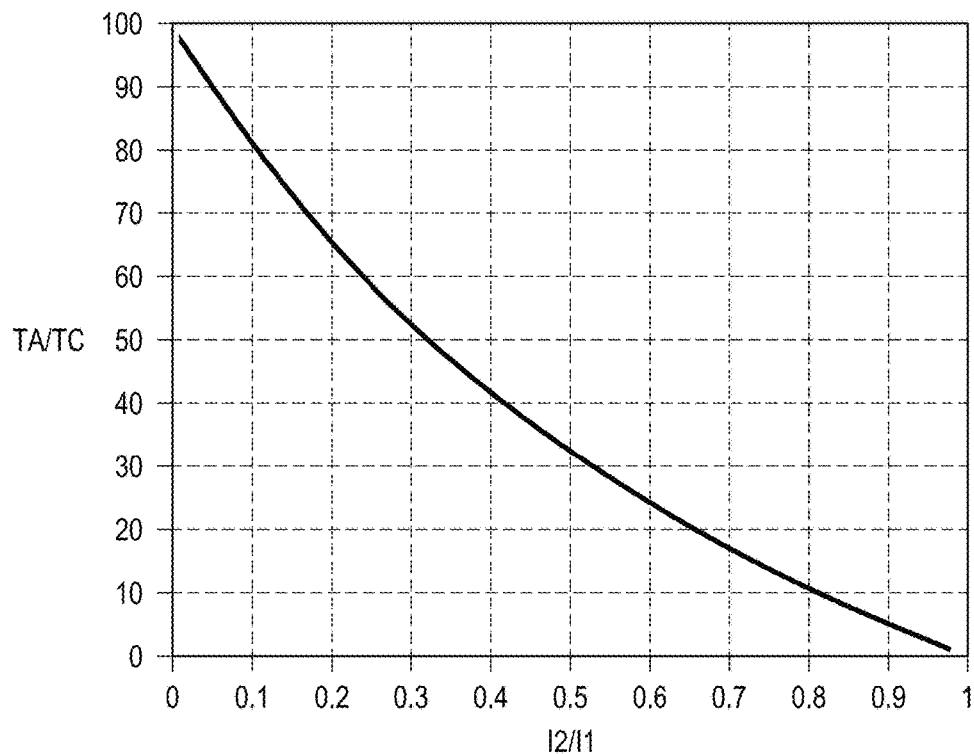
FIG. 7C is a graph illustrating the relative torque between two magnetic configurations.

As illustrated, the electromagnetic torque generated in a NNNN magnetic configuration is relatively greater than the torque generated in a NSNS configuration. In the absence of magnetic saturation, the ratio of the torques developed by the two magnetic configurations (under identical stator excitation) can be approximated as a function of coil dimensions given below and graphically shown as FIG. 7C:

$$\frac{T_A}{T_C} = \frac{l_1 - l_2}{l_1 + l_2} = \frac{1 - \left(\frac{l_2}{l_1}\right)}{1 + \left(\frac{l_2}{l_1}\right)} \qquad (3)$$

where:
$T_A$ is the torque from a radial segment having a NNNN magnetic pole configuration;
$T_C$ is the torque from a radial segment having a NSNS magnetic pole configuration.

Notably the induced back-emf in these topologies follow the same trend and with a judicious selection of coil dimensions, one can introduce a significant drop in the induced voltage for NNNN configuration which corresponds to a drop of electromagnetic torque of the same scale.

A similar analysis may be performed on the magnetic segment 440 having a NNSS magnetic configuration. Again, the total force generated from Lorentz force in each coil leg can be approximated as follows:

$$F = J \times B$$

$$F = I \cdot \vec{a}_z \times B \cdot \vec{a}_r \cdot l_1 + I \cdot \vec{a}_r \times (-B \cdot \vec{a}_z) \cdot l_2 + (-I \cdot \vec{a}_z) \times (-B \cdot \vec{a}_r) \cdot l_1 + (-I \cdot \vec{a}_r) \times (-B \cdot a \vec{a}_z) \cdot l_2$$

$$F = 0 \cdot \vec{a}_\phi$$

As can be observed, the force calculated from equation (1) above is greater than force calculated from equation (4) which indicates the total force generated by the NNNN magnetic orientation is greater than the total force generated by the NNSS configuration—all else being equal. Because the magnetic cylinder segment 440 rotates about the longitudinal axis 401, the electromagnetic torque generated by a NNNN magnetic configuration is also greater than the electromagnetic torque generated by the NSNS magnetic configuration.

Figure 7D:
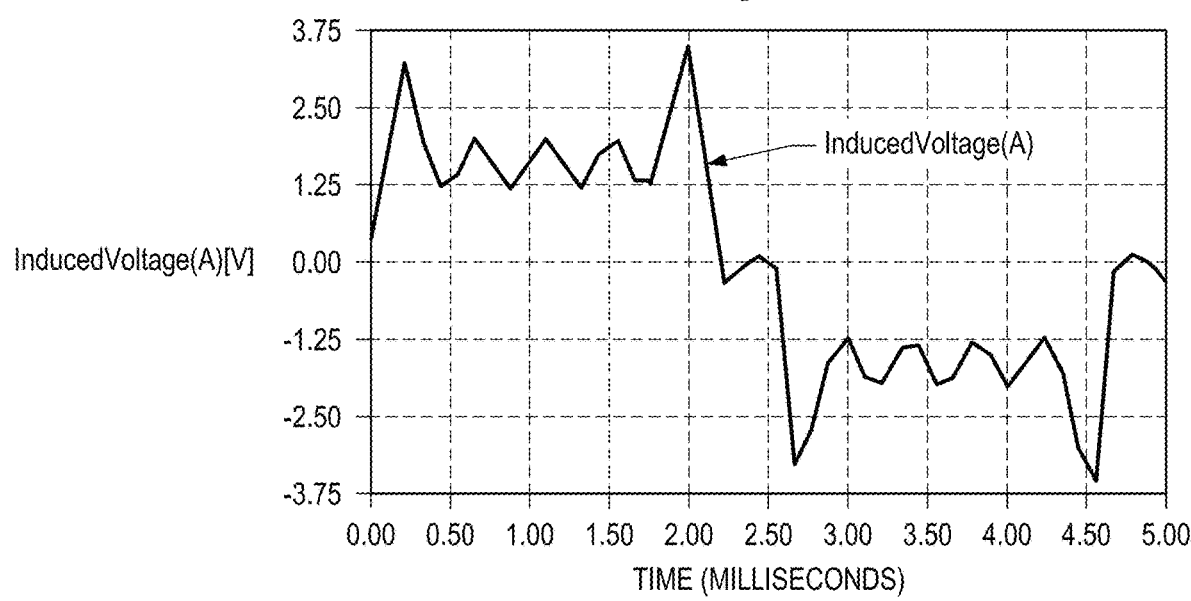

Again, Finite Element Modeling can be performed on a radial segment having an NNSS magnetic pole configuration to verify the above analysis. Through finite element modeling, a graph of the back emf over time for the radial segment 440 having a NNSS magnetic configuration and running at 3000 rpm can be generated. The results are illustrated as FIG. 7D which shows the induced back-emf voltage using a soft magnetic composite core and a single number of turns (e.g., a single conductor) for the coil. As illustrated, the electromagnetic torque generated in a NNNN magnetic configuration is relatively more than the torque generated in a NNSS configuration.

Field Weakening:

As demonstrated above, a NNNN magnetic configuration produces a greater torque than either a NNSS or NSNS magnetic configuration. Consequently, the magnetic field produced by either the NNSS or the NSNS magnetic configuration is less than the magnetic field produced by a NNNN magnetic configuration under the same conditions. Thus, by gradually transitioning from a NNNN magnetic configuration to either a NNSS or NSNS magnetic configuration, field weakening occurs. As the field weakens, the torque is lowered. As the torque is lowered, the rotational speed of the motor increases.

In certain embodiments, a motor at high torque may be in a constant torque mode which results in a base speed. Above the base speed, and up to the motor maximum speed, the motor operates in a constant power mode. In a constant power mode, as the torque is lowered, current increases—resulting in a speed increase.

For instance, for a NNNN to NSNS transition, if the outer and inner magnetic cylinders 406 and 408 rotate with respect to the side magnetic walls 402 and 404, this rotation angle may be used as a controlled variable and the following expressions may be used to demonstrate field weakening:

$$T \propto B I l_1 (1 + (1 - 2\alpha)(l_2 / l_1))$$

$$E = B l_1 (1 + (1 - 2\alpha)(l_2 / l_1))$$

$$\alpha = \frac{2 P \delta^0}{360^0}; \delta = \text{Rotation}; 2P = \text{Pole number}$$

Thus, a transition from a NNNN magnetic configuration to a NSNS magnetic configuration can effectively weaken the field without injection of negative d-axis current as typically used in the prior art and hence maintain high efficiency in the constant power region. It is also notable that torque and speed may have identical decreasing and increasing trends which may result in constant power.

Figure 8A:
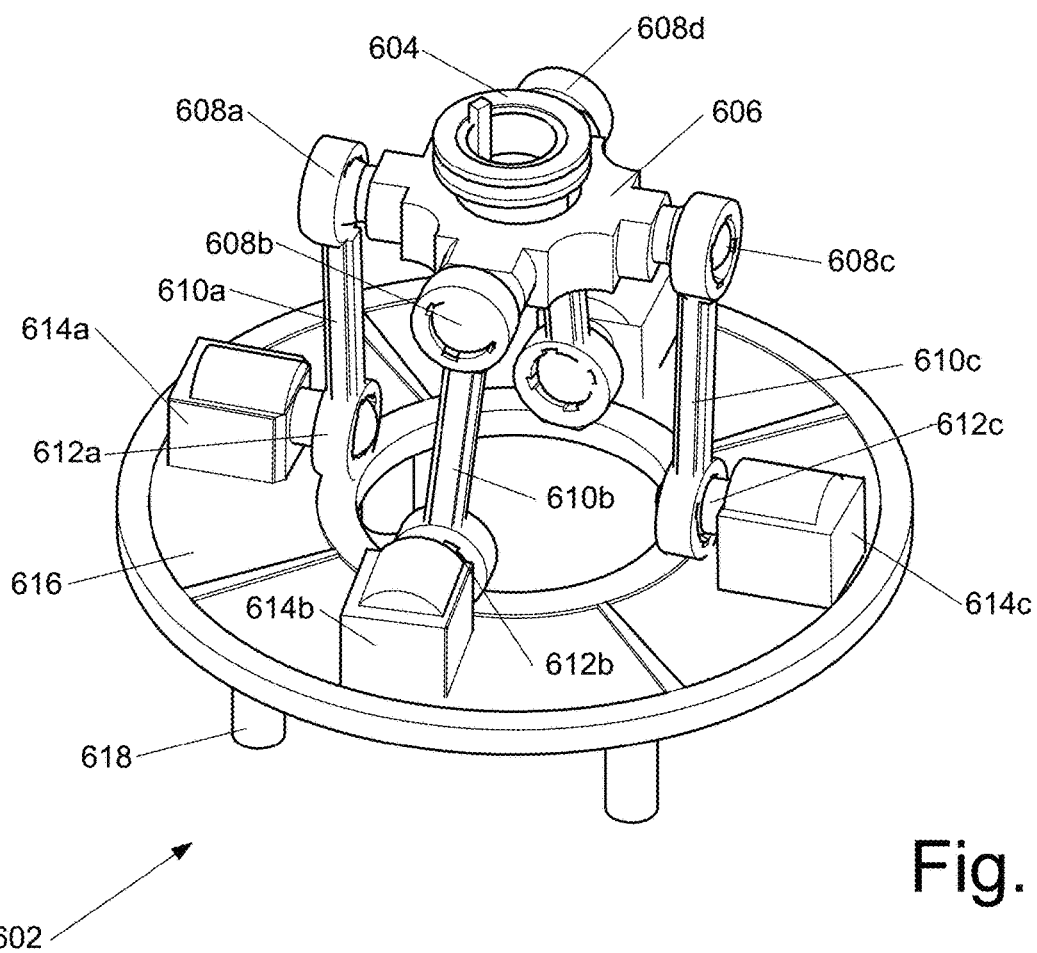
FIGS. 8A to 8E are isometric views details of a rotation actuator which may be used with various embodiments of the present invention.

FIG. 8A illustrates one embodiment of a rotation actuator. In the illustrative embodiment, a ball and knuckle assembly 602 is designed to convert a longitudinal force into a rotational force which can thus rotate a shift plate or portions of the back iron assembly 200. As explained above, once the back iron assembly 200 rotates, the magnetic walls or rotors of the magnetic toroidal cylinder 430 also rotate with respect to each other resulting in a change of magnetic pole configuration.

A shaft collar 604 may be sized to slidingly couple to the shaft 302 of the rotor hub 300 (FIG. 1) so that the shaft can freely rotate when the shaft is inserted into the shaft collar 604. In certain embodiments, the shaft collar 604 couples to a control lever (not shown) which applies a longitudinal force on to the shaft collar. In certain embodiments, the shaft collar 604 can couple to a longitudinal biasing mechanism (not shown) to retain the shaft mechanism longitudinally. Once the applied longitudinal force is great enough to overcome the biasing mechanism, the shaft collar moves longitudinally towards the magnetic disc assembly 400 (FIG. 1). As the shaft collar 604 moves longitudinally, the shaft collar exerts a longitudinal force on a stationary swash ring 606. The stationary swash ring 606 is coupled to four ball joints 608a-608d extending laterally outward from the body of the swash ring.

In the illustrative embodiment, ends of four linkage rods 610a-610d couple to ball joints 608a-608d. The opposing ends of the four linkage rods 610a-610d couple to a second set of ball joints 612a-612d. The ball joints 612a-612d are coupled to a rotating swash plate 616 via rotatable pin connections 614a-614d.

When a longitudinal force (e.g. downward force relative to the page) is applied to the stationary swash ring 606, the swash ring 606 imparts a force on the linkage rods 610a-610d. The longitudinal force on the linkage rods cause the opposing ends of the linkage rods to rotate, which in turn will cause the ball joints 612a-612d and the rotatable pins 614a-614b to rotate. The rotation of the ball joints 612a-612d and the rotatable pin connections 614a-614d cause the swash plate 616 to rotate as illustrated in FIG. 8B.

Figure 8B:
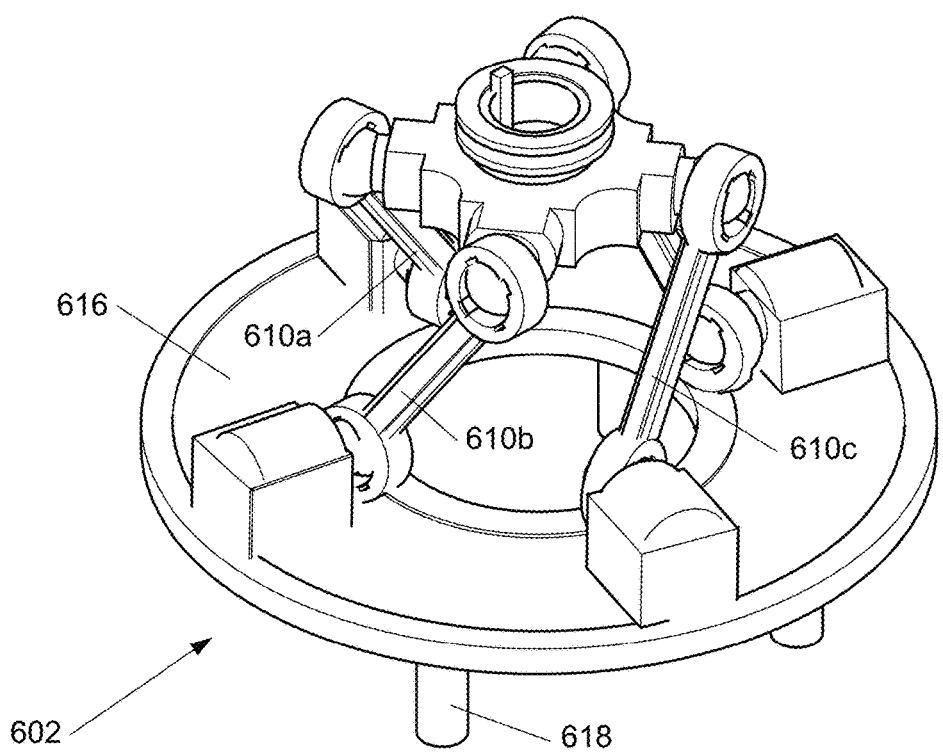

FIG. 8B illustrates the ball and knuckle assembly in a second or rotated position. Pins 618 coupled to the swash plate 616 couple to additional switch plates or to the components of the back iron circuit.

Figure 8C:
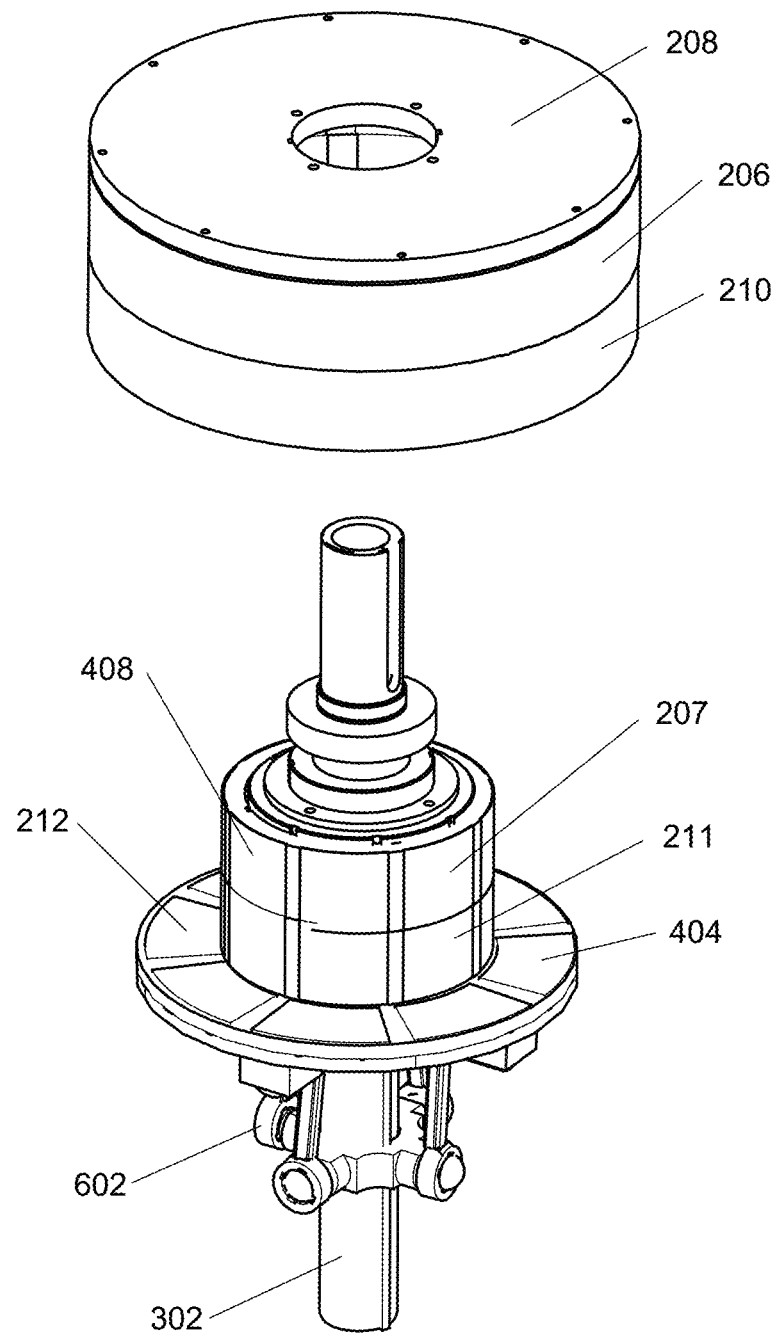

FIG. 8C illustrates the ball and knuckle assembly 602 coupled to a back iron component, specifically the flat side wall 212 (See FIG. 4B) and slidingly coupled to the rotor shaft 302. In the embodiment illustrated in FIG. 8C, the side wall 212 may be rigidly coupled to the interior cylindrical wall 211. In this embodiment, the interior cylindrical wall 211 may be rigidly coupled to the interior cylindrical wall 207 to act as one wall. In other embodiments, the interior cylindrical walls 207 and 211 may be replaced by a single wall. In either event, when the side wall 212 rotates, the inner cylinder walls 211 and 207 (or wall) rotate in unison with the rotation of the side wall 212.

The embodiment illustrated in FIG. 8C illustrates a NNNN configuration to NNSS configuration rotation. Refer back to FIGS. 5C and 5D for a discussion of the NNNN configuration and to FIG. 5G and FIG. 5H for a discussion of the NNSS configuration. As discussed above, when the back iron components rotate, the magnetic walls (e.g. the side wall 404 and the inner magnetic cylindrical wall 408) also rotate because the magnets are fixedly mounted to the back iron components as described above. Thus, when the ball and knuckle assembly 602 rotates one radial magnetic pole or magnetic cylindrical segment length (e.g., 45 degrees for an eight pole or eight cylindrical segment motor), the side plate 212 will also rotate, which in turn will cause the inner cylindrical walls 211 and 207 to rotate with respect to the other back iron components (e.g. the side wall 208 and the outer cylinder walls 206 and 210).

Figure 8D:
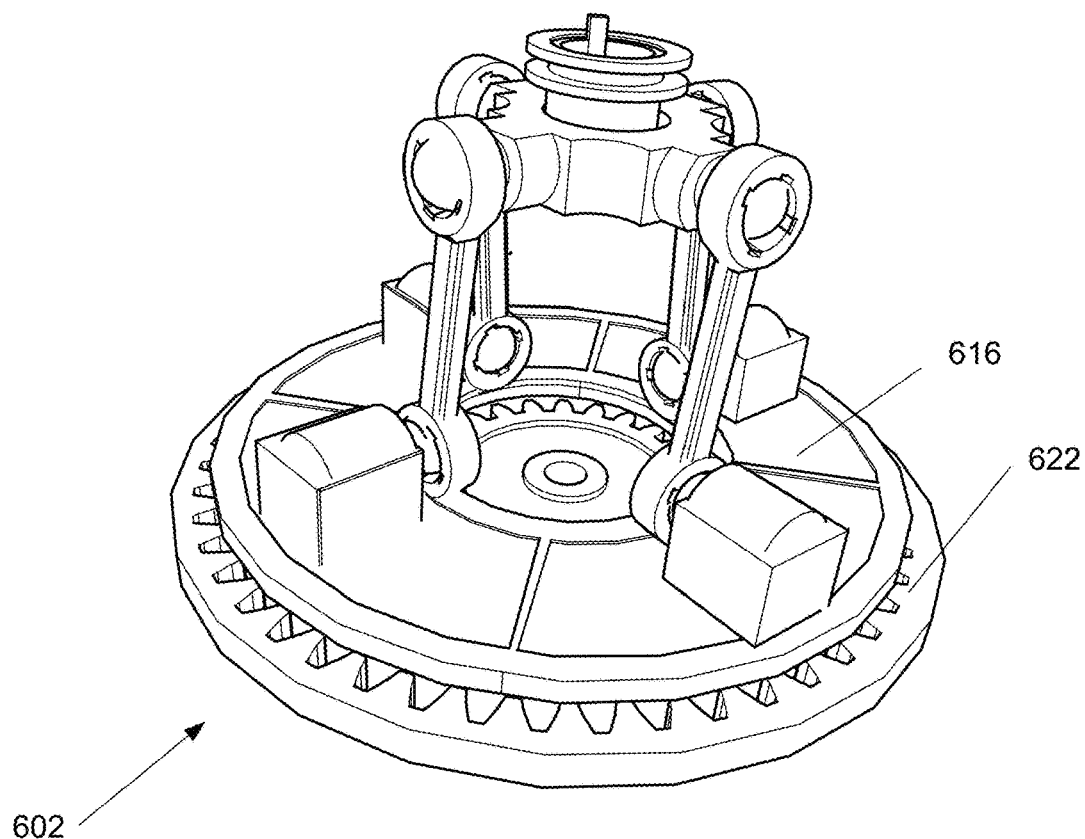
Figure 8E:
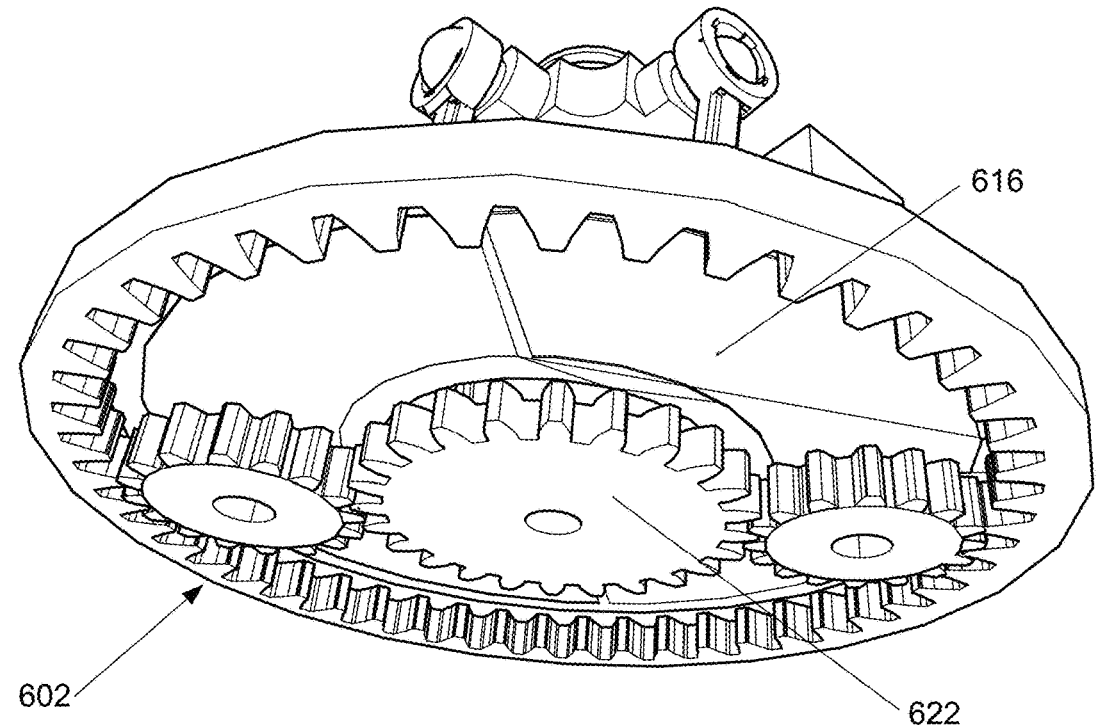

The rotation of the magnets will follow causing a rotation from a first or NNNN configuration illustrated in FIG. 5D to a second or NNSS configuration as illustrated in FIG. 5G. In certain embodiments, friction between the joints of the ball and knuckle assembly 602 can maintain a controlled rotation from the first configuration to a second configuration. In yet, other embodiments, a gear system 622 may be used in conjunction with the rotating swash plate 616 to control the rate of rotation as illustrated in FIGS. 8D and 8E. FIG. 8D illustrates an isometric view of one embodiment of the ball and knuckle assembly 602 where the rotating swash plate 616 is coupled to the gear system 622 to mechanically control the rate of rotation of the rotating swash plate. FIG. 8E is an isometric view of the gear system from another angle.

To limit the overall relative rotation, curved slots may be defined in the swash plates or side walls 208 and 212 as illustrated by the curved slots 620 of FIG. 1. Curved slots 620 limit the over all rotation of the pins 618 (see also FIG. 1), and hence limit the overall rotation of the ball and knuckle assembly 602.

Figure 9:
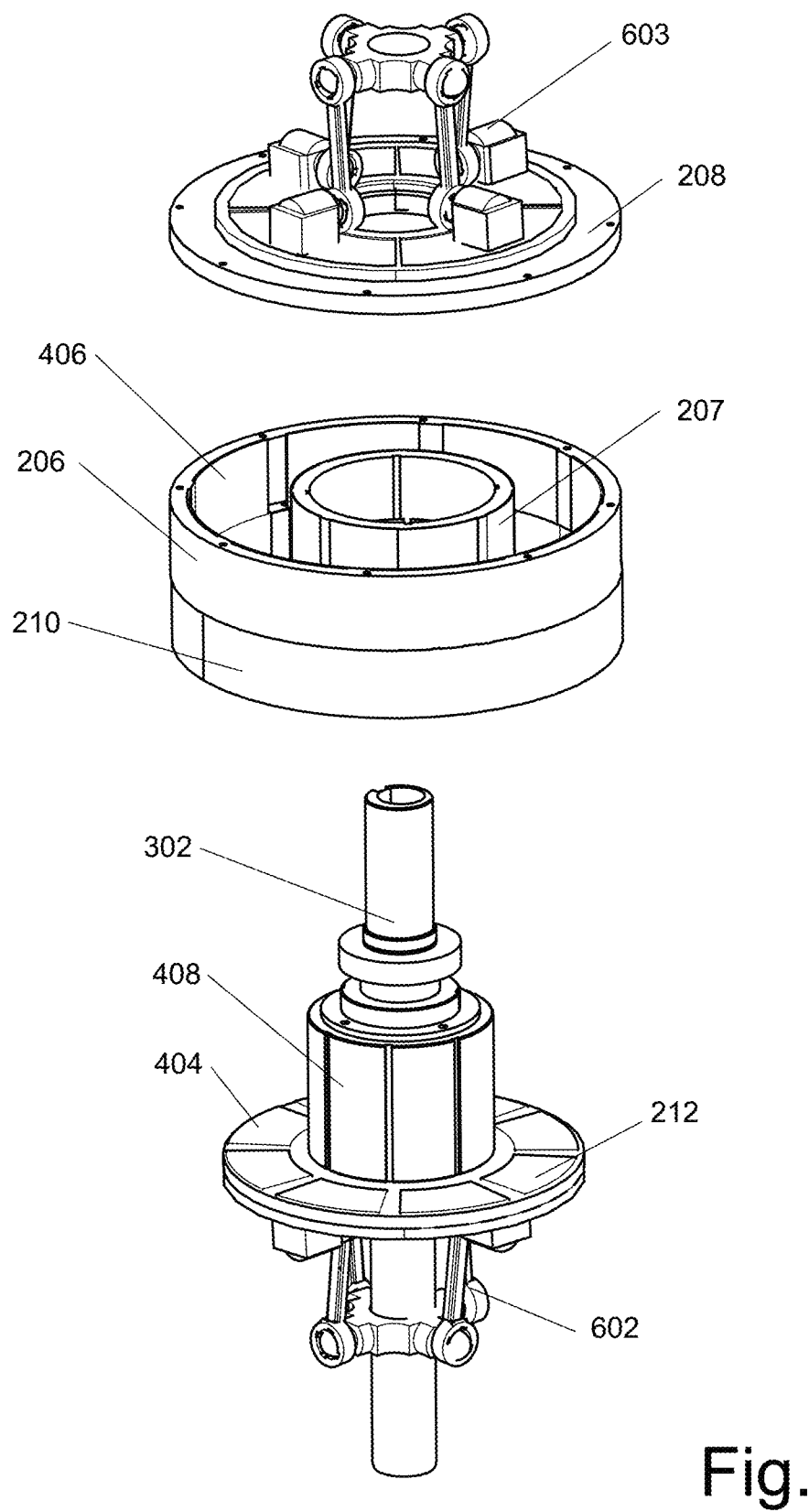
FIG. 9 is an exploded view illustrating an embodiment using two actuators coupled to a magnetic disc assembly and slidingly coupled to a rotor shaft.

FIG. 9 is an exploded view illustrating an embodiment using two the ball and knuckle assembles 602 and 603 coupled to back iron components, specifically the flat side walls 208 and 212, respectively (See FIG. 4B) and slidingly coupled to the rotor shaft 302. The embodiment illustrated in FIG. 9 is similar to the embodiments above. So, identical or similar elements will not be repeated here for reasons of clarity. In the embodiment illustrated in FIG. 9, the side walls 208 and 212 may rotate independently of the outer cylindrical walls 206 and 210 and the inner cylindrical walls 207 and 211 (not visible in FIG. 9).

In this embodiment, the ball and knuckle assemblies 602 and 603 are designed to rotate in unison. Consequently, the side walls 208 and 212 will rotate in unison with respect to the inner side walls 207 and 211 and outer side walls 206 and 210. (As before, the inner side walls 207 and 211 are either joined together or replaced with a single wall. Similarly, the outer side walls 206 and 210 are joined together or replaced with a single outer wall). The embodiment illustrated in FIG. 9 illustrates a NNNN configuration to NSNS configuration rotation. Refer back to FIGS. 5C and 5D for a discussion of the NNNN configuration and to FIG. 5D and FIG. 5F for a discussion of the NSNS configuration. As discussed above, when the back iron components rotate, the magnetic walls (e.g. side walls 404 and 402) also rotate because the magnets are fixedly mounted to the back iron components as described above. Thus, when the ball and knuckle assembly 602 rotates through one radial magnetic pole or magnetic cylindrical segment length (e.g., 45 degrees for an eight pole or eight cylindrical segment motor), the side plate 212 will also rotate (causing the magnetic side wall 404 or rotors to rotate through the same angle). In unison, the ball and knuckle assembly 603 rotates one radial segment length, the side plate 208 will also rotate (causing the magnetic side wall 402 or rotor to rotate through the same angle). In certain embodiments, a coupling device may be used to couple the rotor hub 300 to the outer cylindrical walls 206 and 210 so that they will rotate in unison and independently of the side plates 208 and 212 through the magnetic pole configuration transition. The rotation of the magnetic walls 402 and 404 (or rotors) will follow the rotation of the back iron walls 208 and 212 causing a rotation from a first or NNNN configuration illustrated in FIGS. 5C and 5D to a second or NSNS configuration as illustrated in FIGS. 5E and 5F.

The ball and knuckle assemblies described above are only one embodiment of a rotation actuator which may be used in the disclosed embodiments. Various other options may be used to shift or rotate the magnetic configuration. For instance, a mechanism which uses centrifugal force to cause a weighted positioner to force the rotor plates into the new position may also be used. As the speed of rotation becomes fast enough, the weighted positioner will be thrown from an interior position as illustrated an exterior position. The outward movement of the weighted positioner, in turn causes the back iron components to rotate a predetermined amount. Once the speed slows, a biasing member, such as a spring, allows the weighted positioner to return to its original position.

In other embodiments, applying external power or energy to a pressure plate to move the back iron components relative to each other may be used. Other embodiments may use a mechanism which applies a mechanical braking force to rotate the back iron components relative to each other.

Another rotation actuator may use solenoids, hydraulic or pneumatic rams to apply a force to the back iron components via either electrically or a mechanical linkage. In all cases, the appropriate back iron components may be rotated into a new position relative to the other back iron components to create a new magnetic configuration. The degree of rotation may depend on the number of poles or magnetic tunnels selected in a particular motor. For instance, a "two pole" or "two cylindrical segment" toroidal magnetic cylinder would require a rotation of 180 degrees to shift from a first configuration to a second configuration. On the other hand, a four pole would require a ninety (90) degree rotation. A six pole may require a 60 degree rotation, and so on.

In the various switching mechanisms such as the power plate, as power is applied an equal force is transferred to both plates of the rotor and a rotation is imposed. At a selected speed the pressure plate is applied to one side of a rotor plate. This imposes a drag on the plate reducing its speed. However the speed of the other plate remains constant which forces a shift in the plate's alignment. The shifting action continues to occur until the stop is reached and the rotor plates settle into a second configuration. Since the transition duration is a relatively sort interval it is also possible that power can simply be shut off while the transition takes place.

Upon deceleration the opposite action takes place. Again at a preselected speed the pressure plate is applied, which shifts the back iron walls back into a first configuration. This shifting occurs because the motor is acting as a generator putting a drag on the plates. A return spring may also be utilized to aid the transition back to the first configuration. Throughout the switching, the coils may only be allowed to "fire" at pre programmed times to insure the appropriate coils are producing power at the appropriate times. In various embodiments, the coils may also be used as an aid in the switching process.

In yet other embodiments, a clutch and eddy brake system may be used. In certain embodiments, all side and cylinder walls may be connected to a common shaft. A clutch or a decoupling mechanism may detach the selected pair of rotors or walls. Once the two pair of rotors (e.g., magnetic walls 402 and 404 via the magnetic walls 208 and 212) are decoupled, an eddy current brake may temporarily apply braking torque to the selected pair of rotors (or magnetic walls) to misalign or rotate the rotors relative to the coupled rotors. The eddy current brake may then be de-energized once the desired rotation angle has been achieved. In certain embodiments, the misalignment angle may be decided according to the operational speed.

By de-energizing the eddy current brake, the rotors (or magnetic walls) may be put in tandem through the clutch system and synchronization within a modified magnetic configuration will be re-established. The eddy current brake may be formed by a contactless arrangement in which a segmental disk rotor with surface coils will engage with the permanent magnets of the rotor to create a braking torque. The reverse transition from may be accomplished by reversal of the current direction in eddy current brake or gradual braking the second magnetic pole configuration (e.g. NSNS magnetic pole configuration) to the first magnetic pole configuration (e.g. NNNN magnetic pole configuration).

Figure 10:
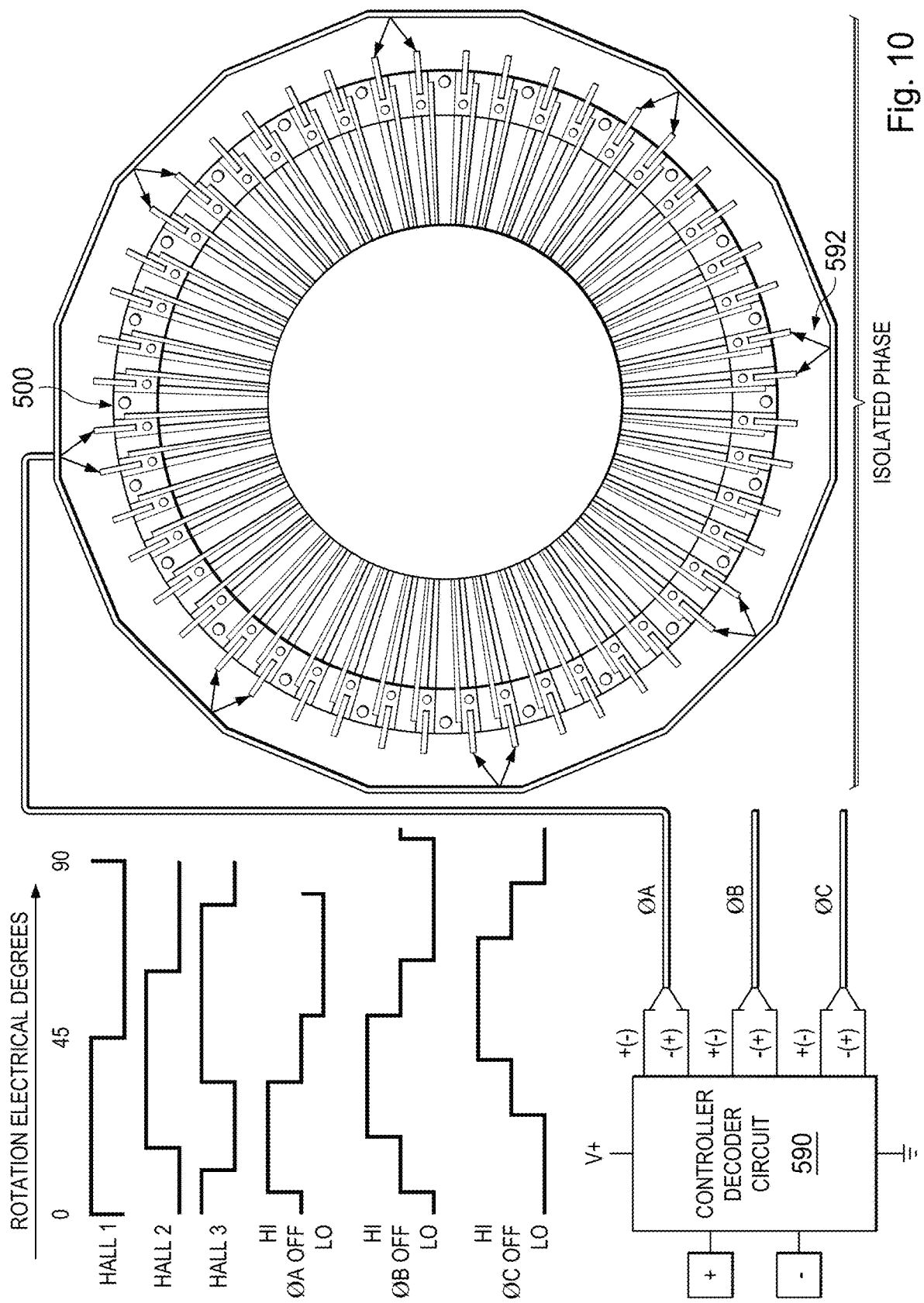
FIG. 10 is a schematic illustration of a coil assembly coupled to a controller.

FIG. 10 is a conceptual drawing of the coil assembly 500 coupled to a plurality of Hall effect sensors 592 which are in electrical communication with a three phase power input and controller 590. Any conventional switching arrangement may be utilized with the controller 590 as is known in the art.

In the illustrative embodiment, the stator or coil assembly 500 may comprise eight (8) uni-polarity sectors containing six (6) coils per magnetic sector. The coils may be are designed to stay continuously energized throughout the 45 degrees of sector movement.

Two adjacent coils may be grouped in series or parallel depending on design requirements and linked to the equivalent coils in each uni-polarity sector. For purposes of clarity only the "A" phase is illustrated. Coils are isolated in this embodiment, but delta and wye connection arrangements may also be utilized.

Each phase is energized with the proper polarity as it enters the uni-polarity sector. The appropriate Hall Effect sensor is then activated at this change in polarity sending a signal to the controller 590 which energizes the proper polarity of power input to Phase A and a continuous supply voltage is impressed on the circuit throughout the coil movement.

When the Hall effect sensor detects the coil is entering the next consecutive uni-polarity sector, a change of state is initiated at which time the coils are again pulsed with a continuous voltage of the proper polarity.

This embodiment uses a variable voltage at the power inputs to control speed and torque as appropriate and may be utilized as another method to control field weakening. Other Phase sequences are possible with this arrangement. For example a 6 phase supply could be connected to 6 circuit groups thus enabling a multipole high torque machine without physical rearrangement of the motor supply conductors. Software can recombine the coil pulse order to overlap adjacent coils of a particular group enabling a 3 phase supply.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112(f). Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC 112(f).

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims. Such embodiments may include:

A electrical machine, comprising:

an axial axis;

a toroidal tunnel positioned about the axial axis, the toroidal tunnel defined by:

a first rotor comprising a first plurality of permanent magnetic poles circumferentially spaced about the axial axis, wherein each magnetic pole in the first plurality of permanent magnetic poles faces towards an interior of the toroidal tunnel and has an opposite magnetic polarity from its adjacent magnetic poles;

a second rotor comprising and positioned opposing the first rotor, the second rotor comprising a second plurality of permanent magnetic poles circumferentially spaced about the axial axis, wherein each magnetic pole in the second plurality of permanent magnetic poles faces towards the interior of the toroidal tunnel and has an opposite magnetic polarity from its adjacent magnetic poles;

the toroidal tunnel adapted to rotate from a first magnetic pole configuration where the magnetic poles are angularly aligned to produce a first level of electromagnetic torque, to a second magnetic pole configuration where the magnetic poles are angularly rotated to produce a second level of electromagnetic torque, a first rotation actuator coupled to at least one of the rotors for mechanically rotating a portion of the toroidal tunnel from the first magnetic pole configuration to the second magnetic pole configuration, and a coil assembly positioned within the toroidal tunnel.

The electrical machine of described above, wherein the first rotor comprises an outside cylindrical wall positioned about the axial axis and the second rotor comprises an inside cylindrical wall positioned about the axial axis and positioned opposing the first cylindrical wall.

The electrical machine described above, wherein the toroidal tunnel further comprises:

a third rotor positioned about the axial axis and positioned axially adjacent to the first rotor and second rotor, wherein the third rotor comprises a third plurality of permanent magnetic poles circumferentially spaced about the axial axis, wherein each magnetic pole in the third plurality of permanent magnetic poles faces towards the interior of the toroidal tunnel and has an opposite magnetic polarity from its adjacent magnetic poles; and a fourth rotor positioned about the axial axis and positioned axially adjacent to the first rotor and second rotor, and axially from the third rotor, wherein the fourth rotor comprises a fourth plurality of permanent magnetic poles circumferentially spaced about the axial axis, wherein each magnetic pole in the fourth plurality of permanent magnetic poles faces towards the interior of the toroidal tunnel and has an opposite magnetic polarity from its adjacent magnetic poles.

The electrical machine described above, wherein the third rotor comprises a first side wall positioned adjacent to the outer cylindrical wall and inner cylindrical wall and the fourth rotor comprises an opposing side wall positioned adjacent to the outer cylindrical wall and inner cylindrical wall and axially away from the first side wall.

The electrical machine described above, wherein in the first magnetic pole configuration, north magnetic pole polarities of the first plurality of permanent magnetic poles, the second plurality of permanent magnetic poles, the third plurality of permanent magnetic poles, and the fourth plurality of permanent magnetic poles are all axially and radially aligned to form a NNNN magnetic pole configuration.

The electrical machine described above, wherein in the second magnetic pole configuration, north magnetic pole polarities of the first plurality of permanent magnetic poles and the north magnetic pole polarities of the second plurality of permanent magnetic poles oppose each other and are radially aligned with the south magnetic pole polarities of the third plurality of permanent magnetic poles and fourth plurality of permanent magnetic poles to form a NSNS magnetic pole configuration.

The electrical machine described above, wherein the first rotation actuator is mechanically coupled to the third rotor such that the third rotor can rotate independently of the first rotor and second rotor from the first magnetic pole configuration, through a predetermined angle of rotation, to the second magnetic pole configuration.

The electrical machine described above, further comprising a second rotation actuator which is coupled to the fourth rotor such that the fourth rotor can rotate independently of the first rotor and the second rotor from the first magnetic pole configuration, through the predetermined angle of rotation to the second magnetic pole configuration.

The electrical machine described above, wherein the first rotation actuator is mechanically coupled to both the third rotor and fourth rotor such that the third and fourth rotors can rotate independently of the first rotor and second rotor from the first magnetic pole configuration, through the predetermined angle of rotation, to the second magnetic pole configuration.

The electrical machine described above, wherein in the second magnetic pole configuration, north magnetic pole polarities of the first plurality of permanent magnetic poles and the north magnetic pole polarities of the third plurality of permanent magnetic poles are axially adjacent to each other and oppose the south magnetic pole polarities of the second plurality of permanent magnetic poles and fourth plurality of permanent magnetic poles to form a NNSS magnetic pole configuration.

The electrical machine described above, wherein the first rotation actuator is mechanically coupled to both the first rotor and third rotor such that the first and third rotors can rotate independently of the second rotor and fourth rotor from the first magnetic pole configuration, through the predetermined angle of rotation, to the second magnetic pole configuration.

A method of producing electric electromotive rotation comprising:

positioning a toroidal tunnel about the axial axis, the toroidal tunnel defined by:

a first rotor comprising a first plurality of permanent magnetic poles circumferentially spaced about the axial axis, wherein each magnetic pole in the first plurality of permanent magnetic poles faces towards an interior of the toroidal tunnel and has an opposite magnetic polarity from its adjacent magnetic poles;

a second rotor comprising and positioned opposing the first rotor, the second rotor comprising a second plurality of permanent magnetic poles circumferentially spaced about the axial axis, wherein each magnetic pole in the second plurality of permanent magnetic poles faces towards the interior of the toroidal tunnel and has an opposite magnetic polarity from its adjacent magnetic poles;

a third rotor positioned about the axial axis and positioned axially adjacent to the first rotor and second rotor, wherein the third rotor comprises a third plurality of permanent magnetic poles circumferentially spaced about the axial axis, wherein each magnetic pole in the third plurality of permanent magnetic poles faces towards the interior of the toroidal tunnel and has an opposite magnetic polarity from its adjacent magnetic poles; and a fourth rotor positioned about the axial axis and positioned axially adjacent to the first rotor and second rotor, and axially from the third rotor, wherein the fourth rotor comprises a fourth plurality of permanent magnetic poles circumferentially spaced about the axial axis, wherein each magnetic pole in the fourth plurality of permanent magnetic poles faces towards the interior of the toroidal tunnel and has an opposite magnetic polarity from its adjacent magnetic poles.

applying current to a coil assembly positioned within the toroidal tunnel to apply an electromagnetic force to the rotors, and rotating at least one rotor defining the toroidal tunnel from a first magnetic pole configuration where the magnetic poles are angularly aligned to produce a first level of electromagnetic torque, to a second magnetic pole configuration where the magnetic poles are angularly rotated to produce a second level of electromagnetic torque.

The method described above, wherein in the first magnetic pole configuration, north magnetic pole polarities of the first plurality of permanent magnetic poles, the second plurality of permanent magnetic poles, the third plurality of permanent magnetic poles, and the fourth plurality of permanent magnetic poles are all axially and radially aligned to form a NNNN magnetic pole configuration.

The method described above, wherein in the second magnetic pole configuration, north magnetic pole polarities of the first plurality of permanent magnetic poles and the north magnetic pole polarities of the second plurality of permanent magnetic poles oppose each other and are radially aligned with the south magnetic pole polarities of the third plurality of permanent magnetic poles and fourth plurality of permanent magnetic poles to form a NSNS magnetic pole configuration.

The method described above, wherein in the second magnetic pole configuration, north magnetic pole polarities of the first plurality of permanent magnetic poles and the north magnetic pole polarities of the third plurality of permanent magnetic poles are axially adjacent to each other and oppose the south magnetic pole polarities of the second plurality of permanent magnetic poles and fourth plurality of permanent magnetic poles to form a NNSS magnetic pole configuration.

The method described above, wherein the rotating at least one rotor defining the toroidal tunnel further comprises rotating the third rotor independently of the first rotor and second rotor from the first magnetic pole configuration, through a predetermined angle of rotation, to the second magnetic pole configuration.

The method described above, wherein the rotating at least one rotor defining the toroidal tunnel further comprises rotating the fourth rotor independently of the first rotor and the second rotor from the first magnetic pole configuration, through the predetermined angle of rotation to the second magnetic pole configuration.

The method described above, wherein the rotating at least one rotor defining the toroidal tunnel further comprises rotating both the third rotor and fourth rotor independently of the first rotor and second rotor from the first magnetic pole configuration, through the predetermined angle of rotation, to the second magnetic pole configuration.

The method described above, wherein the rotating at least one rotor defining the toroidal tunnel further comprises rotating the first rotor and third rotor independently of the second rotor and fourth rotor from the first magnetic pole configuration, through the predetermined angle of rotation, to the second magnetic pole configuration.

What is claimed is:

1. A electrical machine, comprising:
   an axial axis;
   a toroidal tunnel positioned about the axial axis, the toroidal tunnel defined by:
      a first rotor comprising a first plurality of permanent magnetic poles circumferentially spaced about the axial axis, wherein each magnetic pole in the first plurality of permanent magnetic poles faces towards an interior of the toroidal tunnel and has an opposite magnetic polarity from its adjacent magnetic poles;
      a second rotor comprising and positioned opposing the first rotor, the second rotor comprising a second plurality of permanent magnetic poles circumferentially spaced about the axial axis, wherein each magnetic pole in the second plurality of permanent magnetic poles faces towards the interior of the toroidal tunnel and has an opposite magnetic polarity from its adjacent magnetic poles;
   the toroidal tunnel adapted to rotate from a first magnetic pole configuration where the magnetic poles of the first plurality and second plurality of magnetic poles are radially aligned with respect to the axial axis to produce a first level of electromagnetic torque, to a second magnetic pole configuration where the magnetic poles of the second plurality of magnetic poles are angularly rotated with respect to the axial axis to produce a second level of electromagnetic torque,
   a first rotation actuator coupled to at least one of the rotors for mechanically rotating a portion of the toroidal tunnel from the first magnetic pole configuration to the second magnetic pole configuration, and
   a coil assembly positioned within the toroidal tunnel.

2. The electrical machine of claim 1, wherein the first rotor comprises an outside cylindrical wall positioned about the axial axis and the second rotor comprises an inside cylindrical wall positioned about the axial axis and positioned opposing the first cylindrical wall.

3. The electrical machine of claim 1, wherein the toroidal tunnel further comprises:
   a third rotor positioned about the axial axis and positioned axially adjacent to the first rotor and second rotor, wherein the third rotor comprises a third plurality of permanent magnetic poles circumferentially spaced about the axial axis, wherein each magnetic pole in the third plurality of permanent magnetic poles faces towards the interior of the toroidal tunnel and has an opposite magnetic polarity from its adjacent magnetic poles; and
   a fourth rotor positioned about the axial axis and positioned axially adjacent to the first rotor and second rotor, and axially from the third rotor, wherein the fourth rotor comprises a fourth plurality of permanent magnetic poles circumferentially spaced about the axial axis, wherein each magnetic pole in the fourth plurality of permanent magnetic poles faces towards the interior of the toroidal tunnel and has an opposite magnetic polarity from its adjacent magnetic poles.

4. The electrical machine of claim 3, wherein the third rotor comprises a first side wall positioned adjacent to the outer cylindrical wall and inner cylindrical wall and the fourth rotor comprises an opposing side wall positioned adjacent to the outer cylindrical wall and inner cylindrical wall and axially away from the first side wall.

5. The electrical machine of claim 4, wherein in the first magnetic pole configuration, north magnetic pole polarities of the first plurality of permanent magnetic poles, the second plurality of permanent magnetic poles, the third plurality of permanent magnetic poles, and the fourth plurality of permanent magnetic poles are all axially and radially aligned to form a NNNN magnetic pole configuration.

6. The electrical machine of claim 4, wherein in the second magnetic pole configuration, north magnetic pole polarities of the first plurality of permanent magnetic poles and the north magnetic pole polarities of the second plurality of permanent magnetic poles oppose each other and are radially aligned with the south magnetic pole polarities of the third plurality of permanent magnetic poles and fourth plurality of permanent magnetic poles to form a NSNS magnetic pole configuration.

7. The electrical machine of claim 6, wherein the first rotation actuator is mechanically coupled to the third rotor such that the third rotor can rotate independently of the first rotor and second rotor from the first magnetic pole configuration, through a predetermined angle of rotation, to the second magnetic pole configuration.

8. The electrical machine of claim 7, further comprising a second rotation actuator which is coupled to the fourth rotor such that the fourth rotor can rotate independently of the first rotor and the second rotor from the first magnetic pole configuration, through the predetermined angle of rotation to the second magnetic pole configuration.

9. The electrical machine of claim 6, wherein the first rotation actuator is mechanically coupled to both the third rotor and fourth rotor such that the third and fourth rotors can rotate independently of the first rotor and second rotor from the first magnetic pole configuration, through the predetermined angle of rotation, to the second magnetic pole configuration.

10. The electrical machine of claim 4, wherein in the second magnetic pole configuration, north magnetic pole polarities of the first plurality of permanent magnetic poles and the north magnetic pole polarities of the third plurality of permanent magnetic poles are axially adjacent to each other and oppose the south magnetic pole polarities of the second plurality of permanent magnetic poles and fourth plurality of permanent magnetic poles to form a NNSS magnetic pole configuration.

11. The electrical machine of claim 10, wherein the first rotation actuator is mechanically coupled to both the first rotor and third rotor such that the first and third rotors can rotate independently of the second rotor and fourth rotor from the first magnetic pole configuration, through the predetermined angle of rotation, to the second magnetic pole configuration.

12. A method of producing electric electromotive rotation comprising:
positioning a toroidal tunnel about the axial axis, the toroidal tunnel defined by:
a first rotor comprising a first plurality of permanent magnetic poles circumferentially spaced about the axial axis, wherein each magnetic pole in the first plurality of permanent magnetic poles faces towards an interior of the toroidal tunnel and has an opposite magnetic polarity from its adjacent magnetic poles;
a second rotor comprising and positioned opposing the first rotor, the second rotor comprising a second plurality of permanent magnetic poles circumferentially spaced about the axial axis, wherein each magnetic pole in the second plurality of permanent magnetic poles faces towards the interior of the toroidal tunnel and has an opposite magnetic polarity from its adjacent magnetic poles;
a third rotor positioned about the axial axis and positioned axially adjacent to the first rotor and second rotor, wherein the third rotor comprises a third plurality of permanent magnetic poles circumferentially spaced about the axial axis, wherein each magnetic pole in the third plurality of permanent magnetic poles faces towards the interior of the toroidal tunnel and has an opposite magnetic polarity from its adjacent magnetic poles; and
a fourth rotor positioned about the axial axis and positioned axially adjacent to the first rotor and second rotor, and axially from the third rotor, wherein the fourth rotor comprises a fourth plurality of permanent magnetic poles circumferentially spaced about the axial axis, wherein each magnetic pole in the fourth plurality of permanent magnetic poles faces towards the interior of the toroidal tunnel and has an opposite magnetic polarity from its adjacent magnetic poles,
applying current to a coil assembly positioned within the toroidal tunnel to apply an electromagnetic force to the rotors, and
rotating at least one rotor defining the toroidal tunnel from a first magnetic pole configuration where the magnetic poles of the first, second, third, and fourth plurality of magnetic poles are radially aligned with respect to the axial axis to produce a first level of electromagnetic torque, to a second magnetic pole configuration where at least the magnetic poles of the first plurality of magnetic poles are angularly rotated with respect to the axial axis to produce a second level of electromagnetic torque.

13. The method of claim 12, wherein in the first magnetic pole configuration, north magnetic pole polarities of the first plurality of permanent magnetic poles, the second plurality of permanent magnetic poles, the third plurality of permanent magnetic poles, and the fourth plurality of permanent magnetic poles are all axially and radially aligned to form a NNNN magnetic pole configuration.

14. The method of claim 12, wherein in the second magnetic pole configuration, north magnetic pole polarities of the first plurality of permanent magnetic poles and the north magnetic pole polarities of the second plurality of permanent magnetic poles oppose each other and are radially aligned with the south magnetic pole polarities of the third plurality of permanent magnetic poles and fourth plurality of permanent magnetic poles to form a NSNS magnetic pole configuration.

15. The method of claim 12, wherein in the second magnetic pole configuration, north magnetic pole polarities of the first plurality of permanent magnetic poles and the north magnetic pole polarities of the third plurality of permanent magnetic poles are axially adjacent to each other and oppose the south magnetic pole polarities of the second plurality of permanent magnetic poles and fourth plurality of permanent magnetic poles to form a NNSS magnetic pole configuration.

16. The method of claim 12, wherein the rotating at least one rotor defining the toroidal tunnel further comprises rotating the third rotor independently of the first rotor and second rotor from the first magnetic pole configuration, through a predetermined angle of rotation, to the second magnetic pole configuration.

17. The method of claim 12, wherein the rotating at least one rotor defining the toroidal tunnel further comprises rotating the fourth rotor independently of the first rotor and the second rotor from the first magnetic pole configuration, through the predetermined angle of rotation to the second magnetic pole configuration.

18. The method of claim 12, wherein the rotating at least one rotor defining the toroidal tunnel further comprises rotating both the third rotor and fourth rotor independently of the first rotor and second rotor from the first magnetic pole configuration, through the predetermined angle of rotation, to the second magnetic pole configuration.

19. The method of claim 12, wherein the rotating at least one rotor defining the toroidal tunnel further comprises rotating the first rotor and third rotor independently of the second rotor and fourth rotor from the first magnetic pole configuration, through the predetermined angle of rotation, to the second magnetic pole configuration.

\* \* \* \* \*